United States Patent
Ulanoski et al.

(10) Patent No.: US 6,318,668 B1
(45) Date of Patent: Nov. 20, 2001

(54) THRUST VECTORING TECHNIQUES

(75) Inventors: Michael S. Ulanoski, Louisville, KY (US); Jagdish S. Sokhey, Loveland, OH (US); Baily R. Vittal, Carmel; Von D. Baker, Indianapolis, both of IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/246,426

(22) Filed: Feb. 8, 1999

Related U.S. Application Data

(63) Continuation-in-part of application No. 09/055,663, filed on Sep. 6, 1998, now Pat. No. 6,105,901, which is a continuation of application No. 08/692,017, filed on Aug. 2, 1996, now abandoned.

(51) Int. Cl.$^7$ ............................. B64C 15/02; B64C 29/00
(52) U.S. Cl. ................. 244/12.5; 244/23 D; 239/265.19
(58) Field of Search ................................ 244/12.1, 12.4, 244/12.5, 12.2, 23 A, 23 D, 82; 60/230; 239/265.19

(56) References Cited

U.S. PATENT DOCUMENTS

| | | | |
|---|---|---|---|
| 2,502,045 | 3/1950 | Johnson | 244/12 |
| 2,930,544 | 3/1960 | Howell | 244/12 |
| 2,989,269 | 6/1961 | Le Bel | 244/12 |
| 3,081,597 | * 3/1963 | Kosin et al. | 244/23 D |
| 3,087,303 | * 4/1963 | Heinze et al. | 244/12.5 X |
| 3,099,423 | 7/1963 | Wilde et al. | 244/23 |
| 3,174,709 | * 3/1965 | Alderson | 244/23 D |
| 3,179,353 | 4/1965 | Peterson | 244/12 |
| 3,206,929 | 9/1965 | Marchant et al. | 60/35.55 |
| 3,397,852 | 8/1968 | Katzen | 244/12 |
| 3,545,209 | 12/1970 | Millward | 60/226 |
| 3,640,469 | 2/1972 | Hayes et al. | 239/265.35 |
| 3,912,201 | 10/1975 | Bradbury | 244/23 |
| 4,018,046 | 4/1977 | Hurley | 60/264 |
| 4,162,040 | 7/1979 | Carey | 239/265.33 |
| 4,205,813 | 6/1980 | Evans et al. | 244/12.5 |
| 4,226,084 | 10/1980 | Spears, Jr. | 60/262 |
| 4,241,876 | 12/1980 | Pedersen | 239/265.27 |
| 4,474,345 | 10/1984 | Musgrove | 244/53 |
| 4,587,806 | 5/1986 | Madden | 60/271 |
| 4,606,499 | 8/1986 | Langley, Jr. | 239/11 |
| 4,798,328 | 1/1989 | Thayer et al. | 239/1 |
| 4,805,401 | 2/1989 | Thayer et al. | 60/226.2 |
| 4,828,203 | 5/1989 | Clifton et al. | 244/12.3 |
| 4,836,451 | 6/1989 | Herrick et al. | 239/265.27 |
| 5,039,014 | 8/1991 | Lippmeier | 239/265.27 |
| 5,209,428 | 5/1993 | Bevilaqua et al. | 244/12.3 |
| 5,294,055 | 3/1994 | Garrett et al. | 239/265.27 |
| 5,464,175 | 11/1995 | Short | 244/12.5 |
| 5,485,958 | 1/1996 | Nightingale | 239/265.27 |
| 5,630,564 | 5/1997 | Speicher et al. | 244/3.24 |
| 5,687,907 | 11/1997 | Holden | 239/265.27 |
| 5,694,766 | 12/1997 | Smereczniak et al. | 60/204 |
| 5,706,649 | 1/1998 | Robinson et al. | 60/226.2 |
| 5,740,988 | 4/1998 | Ausdenmoore | 244/52 |
| 5,769,317 | 6/1998 | Sokhey et al. | 239/1 |

FOREIGN PATENT DOCUMENTS 1018581   1/1966   (GB) .

* cited by examiner

*Primary Examiner*—Robert P. Swiatek
(74) *Attorney, Agent, or Firm*—Woodard, Emhardt, Naughton, Moriarty & McNett

(57) ABSTRACT

A thrust directing mechanism to vector thrust and control discharge throat area with a number of vanes mounted across the passage. The mechanism includes a control link pivotally coupled to each of the vanes. The control link is selectively movable to correspondingly pivot the vanes and has at least two degrees of freedom corresponding to a two coordinate position. A desired orientation of the vanes may be determined as a function of the two coordinate position. The discharge exit area is contracted by adjusting convergence of the vanes. During convergence, the vanes are pivoted to various pivot angles selected to optimize thrust efficiency when contracting the throat area.

53 Claims, 16 Drawing Sheets

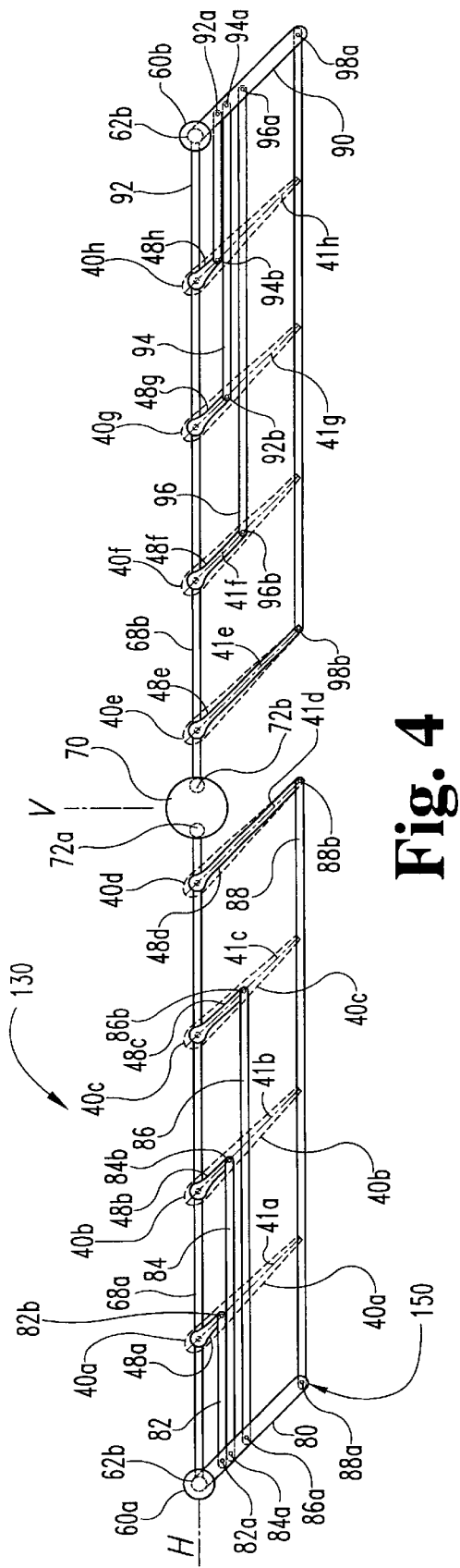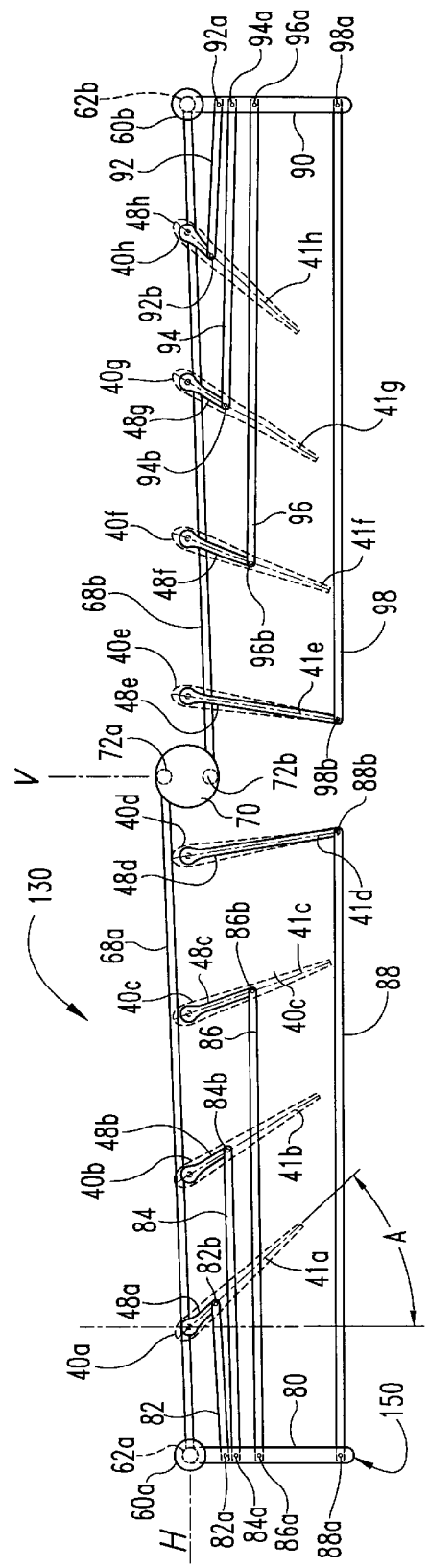
Fig. 4
Fig. 5

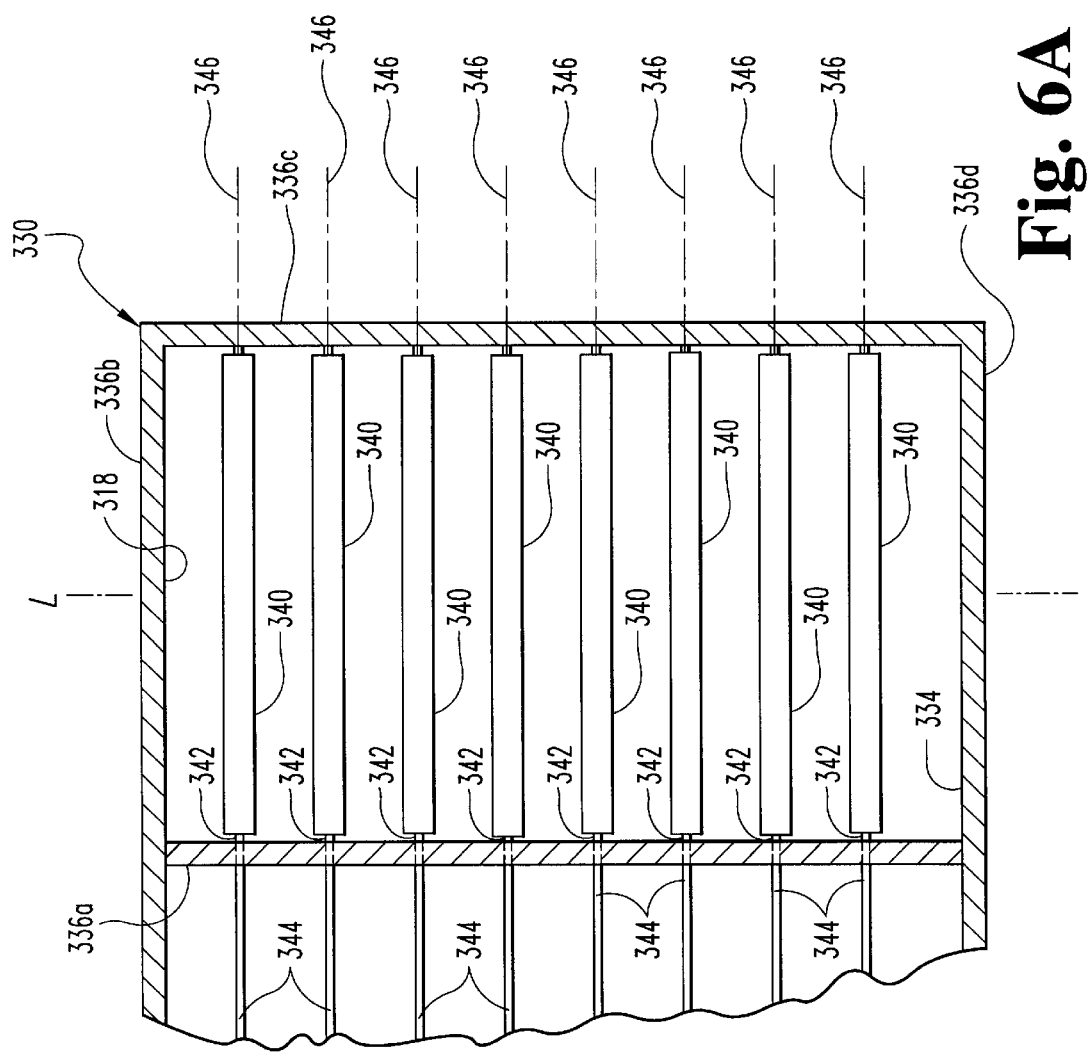

THRUST VECTORING TECHNIQUES

CROSS-REFERENCE TO RELATED APPLICATION

This application is a continuation-in-part of U.S. patent application Ser. No. 09/055,663, filed on Apr. 6, 1998, now U.S. Pat. No. 6,105,901, which is a continuation of U.S. patent application Ser. No. 08/692,017, filed Aug. 2, 1996 and now abandoned.

BACKGROUND OF THE INVENTION

The present invention relates to thrust vectoring techniques, and more particularly, but not exclusively, relates to techniques to control thrust vectoring and nozzle throat area with variable pitch guide vanes.

Typically, a jet powered aircraft is controllably propelled by thrust substantially parallel with and in a direction opposite working fluid exiting a nozzle. Consequently, if the direction of the working fluid is changed, the direction of propulsive thrust and the aircraft direction is corresponding varied. As used herein, "nozzle" means an aircraft passage or outlet for discharging working fluid to produce thrust.

With the advent of vertical or short take off and vertical landing (V/STOVL) aircraft, the need for efficient, uninterrupted vectoring of thrust has arisen. The hot gases exhausted from a gas turbine engine are one source of working fluid which may be vectored. Alternatively, "cold flow" from a lift fan may also serve as a working fluid source. Such a lift fan is typically driven indirectly by a coupling to a gas turbine engine. U.S. Pat. No. 5,209,428 to Bevilaqua et al. is cited as a source of further information concerning lift fan aircraft.

For the V/STOVL mode of aircraft operation, a continuous, uninterrupted vectoring of thrust is required throughout a wide angular range to provide lift for the aircraft. Also, a smooth and reliable transition to a horizontal cruise mode is often required. Moreover, as with most aircraft equipment, thrust vectoring systems generally must be lightweight, reliable, and compact, occupying as little space as possible. U.S. Pat. Nos. 5,769,317 to Sokhey et al.; U.S. Pat. No. 5,485,958 to Nightingale; U.S. Pat. No. 3,640,469 to Hayes et al.; U.S. Pat. No. 3,397,852 to Katzen; U.S. Pat. No. 3,179,353 to Peterson; and U.S. Pat. No. 2,989,269 to Le Bel illustrate various guide vane bank arrangements for vectoring thrust.

One typical drawback of these systems is the inability to selectively adjust the exit area presented to working fluid as it passes through the vanes while simultaneously and independently deflecting the exiting working fluid to vector thrust. The ability to select the working fluid exit area or throat area generally improves vectoring system efficiency.

One approach to this problem is to simultaneously adjust vectoring and throat area by using an independently controllable actuator for each vane in the bank. Unfortunately, this approach is often impractical because of the attendant increase in weight, complexity, and space required for the separate actuators.

Furthermore, proposed systems do not appear to account for changes in thrust efficiency of a given vectoring nozzle design that occur in response to changes in pivotal orientation of the vanes.

Thus, there remains a need for improved techniques to selectively vector thrust with a number of guide vanes.

SUMMARY OF THE INVENTION

One form of the present invention is to discharge working fluid from an aircraft to produce thrust and vector thrust by deflecting the working fluid with a number of vanes.

In an alternative form an improved thrust vectoring system is provided.

In another alternative form, a thrust vectoring system includes a plurality of thrust directing members positioned across a discharge outlet. These members include a plurality of leading edge caps and a corresponding plurality of articulating vanes. The vanes are each nested within a recess defined by a corresponding one of the leading edge caps to pivot relative thereto. The directing members may span across a generally rectangularly shaped outlet. Also, in one preferred embodiment, the leading edge caps are fixed to a wall of the passage and arranged in a convergent pattern relative to a reference axis.

A further alternative form of the present invention is a method and technique for discharging a working fluid through an outlet of an aircraft nozzle to produce thrust; where the nozzle is in fluid communication with an aircraft working fluid source and has at least four vanes pivotally mounted across the outlet. The vanes are pivoted to change thrust direction during this discharge including adjusting convergence of the vanes to maintain a first throat area. Also, magnitude of the thrust is modulated while the working fluid is being discharged by pivoting the vanes to change from the first throat area to a second throat area while maintaining a generally constant direction of the thrust.

Another alternative form includes a thrust vectoring nozzle with a number of guide vanes. Variation of the nozzle's discharge coefficient with changes in vane orientation results in an attendant change in effective throat area of the nozzle. Changes in effective throat area may not be uniform with respect to changes in the geometric throat area of the nozzle. As used herein, the "discharge coefficient" of a nozzle refers to the ratio between actual fluid mass flow through the nozzle and the ideal or theoretically attainable fluid mass flow through the nozzle. For practical nozzle designs, the discharge coefficient is generally less than one (<1) due to the formation of boundary layers and other non-ideal conditions. The "geometric throat area" of a nozzle refers to the measured throat area of the nozzle configuration. The "effective throat area" of a nozzle refers to a nozzle area that is required to attain a desired actual mass flow rate through a given nozzle configuration and is defined by the expression:

$$\text{effective throat area} = (AFR/IFR) * GTA;$$

where AFR=actual flow rate, IFR=ideal or theoretically attainable flow rate, and GTA=geometric throat area of the nozzle. The term (AFR/IFR) is the discharge coefficient for the given nozzle. For a discharge coefficient less than one (<1), the effective throat area is less than the geometric throat area. Maintaining a generally constant geometric throat area while discharge coefficient varies with changes in vane orientation, typically results in a change in thrust vector magnitude for a constant level of working fluid supplied to the nozzle. In contrast, a generally constant effective throat area accounts for discharge coefficient changes and results in an approximately constant thrust magnitude for a constant level of working fluid supplied to the nozzle.

In an additional alternative form, an aircraft is operated that has a passage with an outlet. The aircraft has at least four vanes pivotally mounted across the outlet. This operation includes discharging a working fluid through the outlet to produce thrust. The vanes are pivoted to change thrust direction during discharge of the working fluid. Also, while the working fluid is being discharged, the vanes are splayed to modulate thrust magnitude while maintaining a generally constant thrust vector direction.

Another alternative form of the present invention includes operating an aircraft with a passage having an outlet; where at least four vanes are pivotally mounted across the outlet. This operation includes discharging a working fluid through the outlet to produce thrust. During this discharge of the working fluid, the vanes are pivoted to vector the thrust over a predetermined range of directions. Geometric throat area is changed during this pivoting to maintain a generally constant effective throat area over the range of directions.

Other alternative forms include an aircraft defining a passage having an outlet and a lift fan mounted in the passage operable to discharge working fluids through the outlet to produce thrust. Also, at least four vanes are pivotally mounted across the outlet to vector the thrust. An actuator controlled linkage couples the vanes which simultaneously pivot in response to movement of the linkage. A controller generates a vane control signal to provide a desired thrust vector; where the control signal corresponds to a desired pivotal orientation of each of the vanes and is determined in accordance with data corresponding to a relationship between thrust vector direction and throat area. The linkage responds to this control signal to correspondingly provide the desired pivotal orientation of the vanes.

Still other alternative forms include an aircraft defining a passage therethrough having an outlet; where the outlet has a cross section with a first generally straight boundary opposite a second generally straight boundary and a third generally straight boundary opposite a fourth generally straight boundary. The first and second boundaries of the outlet are oriented at generally right angles to the third and fourth boundaries. A lift fan is mounted in the passage to discharge a working fluid through the outlet to produce thrust. A first vane or flap is aligned to extend a first side of the passage that is pivotally mounted to selectively deflect the working fluid passing through the passage and includes a trailing edge defining the first boundary of the outlet. Also, a second vane or flap is aligned to extend a second side of the passage opposite the first side and includes a trailing edge defining the second boundary of the outlet. At least two other vanes are pivotally mounted across the outlet between the first and second vanes to controllably deflect the working fluid. Also included is an actuation system operable to selectively pivot the first vane, the second vane, and the other vanes to adjust thrust direction while maintaining a generally uniform effective throat area.

Accordingly, one object of the present invention is to vector thrust with a number of movable vanes placed in a working fluid stream.

Additionally or alternatively, another object of the present invention is to provide improved thrust vectoring devices and techniques.

Further objects, advantages, features, benefits, forms, and aspects of the present invention will become apparent from the drawings and description provided herein.

BRIEF DESCRIPTION OF THE DRAWINGS

FIG. 4 is a diagrammatic side view of the embodiment of FIG. 3 with the vanes shown in a second position in phantom.

FIG. 5 is a diagrammatic side view of the embodiment of FIG. 3 with the vanes shown in a third position in phantom.

FIG. 6A is a partial cross-sectional view of a second embodiment of the present invention.

DESCRIPTION OF THE PREFERRED EMBODIMENTS

Figure 1:
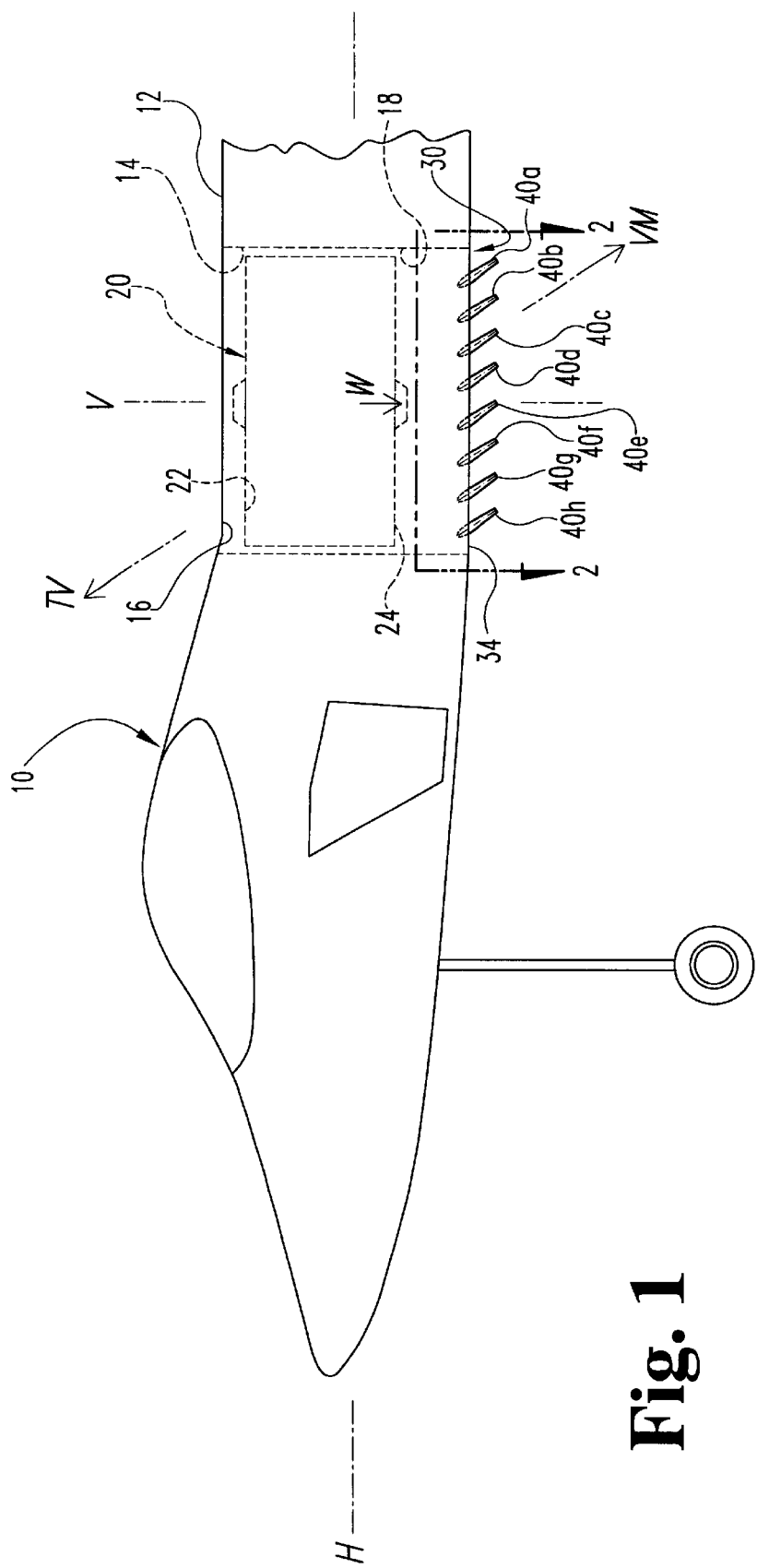
FIG. 1 is a partial, diagrammatic view of an aircraft with thrust vectoring guide vanes of a first embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates.

FIG. 1 illustrates aircraft 10 of a first embodiment of the present invention. Aircraft 10 has fuselage 12 defining cavity 14. Cavity 14 has intake opening 16 and discharge passage 18. Cavity 14 also houses lift engine 20 therein.

Lift engine 20 has inlet 22 and opposing working fluid exit 24. Preferably, lift engine 20 is a gas turbine engine, which receives air through inlet 22 and internally compresses it for discharge as a working fluid through exit 24 along the direction indicated by arrow W to provide thrust. In an alternative embodiment, a remotely driven cold flow lift fan may be utilized instead of a gas turbine engine. In still other embodiments, other types of aircraft thrust sources may be employed.

Figure 2:
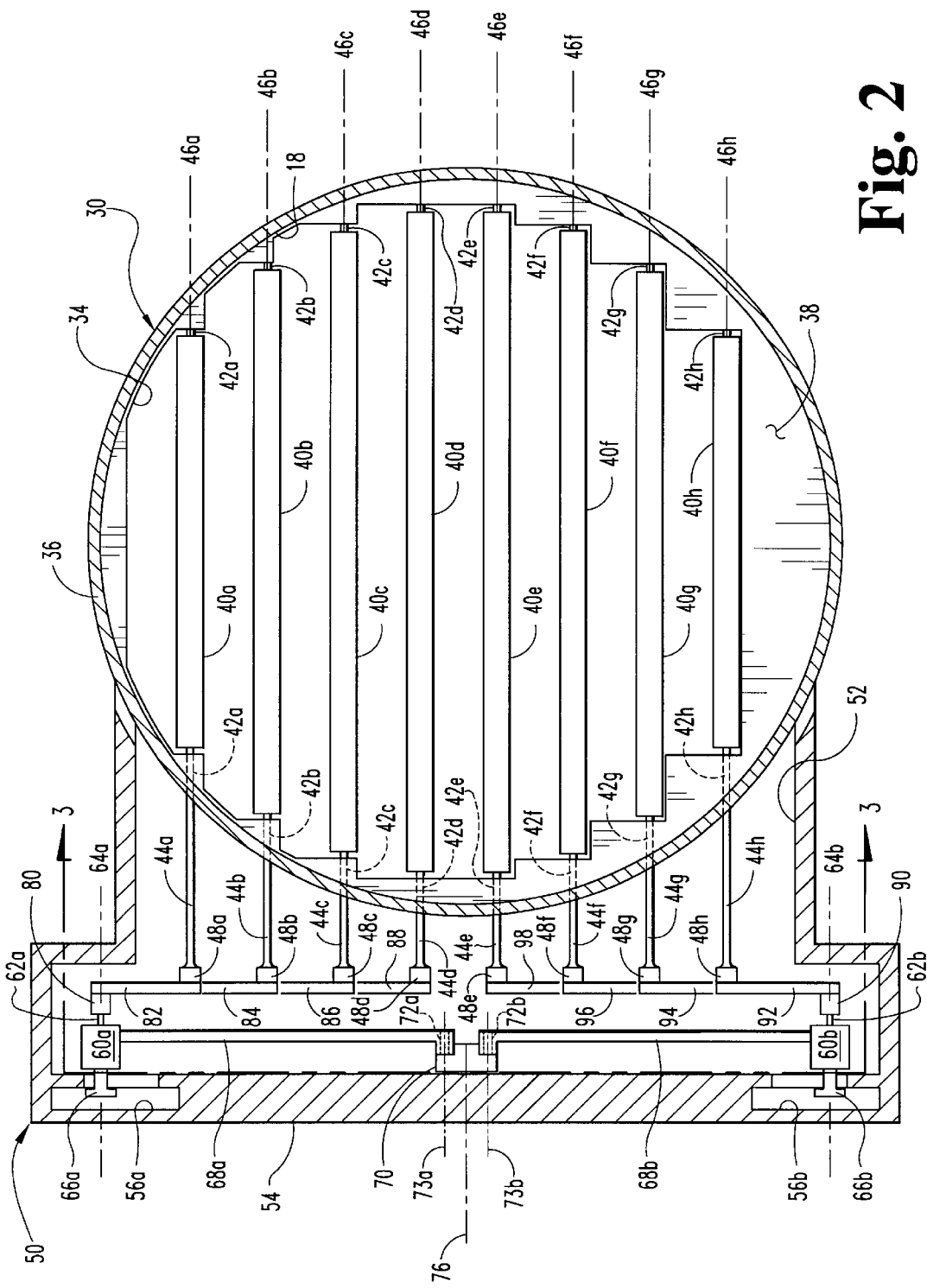
FIG. 2 is a partial, diagrammatic cross-sectional view of the embodiment shown in FIG. 1.

Thrust directing mechanism 30 receives working fluid flowing along arrow W in 20 discharge passage 18 and discharges the working fluid through outlet 34. Referring additionally to FIGS. 2, further details of thrust directing mechanism 30 are depicted in a partial diagrammatic sectional view taken along section line 2—2 of FIG. 1. Thrust directing mechanism 30 includes a number of variable pitch vanes 40a, 40b, 40c, 40d, 40e, 40f, 40g, 40h (collectively designated vanes 40). The orientation of vanes 40 is controlled to direct the flow of working fluid as it exits outlet 34.

Vanes 40 preferably span across outlet 34 and are airfoil shaped in a manner configured to maximize thrust efficiency and thrust directing capability. Vanes 40 are each pivotally mounted to aircraft 10 by a corresponding mounting shaft 42a, 42b, 42c, 42d, 42e, 42f, 42g, 42h (collectively referred to as shafts 42). Each shaft 42 is journaled to aircraft 10 adjacent each opposing end of the corresponding vane 40. Preferably, an appropriate pair of journal bearings is used for each shaft. These bearings should provide smooth and reliable rotational positioning of each of vanes 40 about a corresponding rotational axis 46a, 46b, 6c, 46d, 46e, 46f, 46g, 46h (collectively referred to as rotational axes 46). Each shaft 42 as a control portion 44a, 44b, 44c, 44d, 44e, 44f, 44g, 44h (collectively referred to as ontrol portions 44) extending through wall 36. Control portions 44 extend into housing 52 as part of control linkage 50 enclosed therein.

Figure 3:
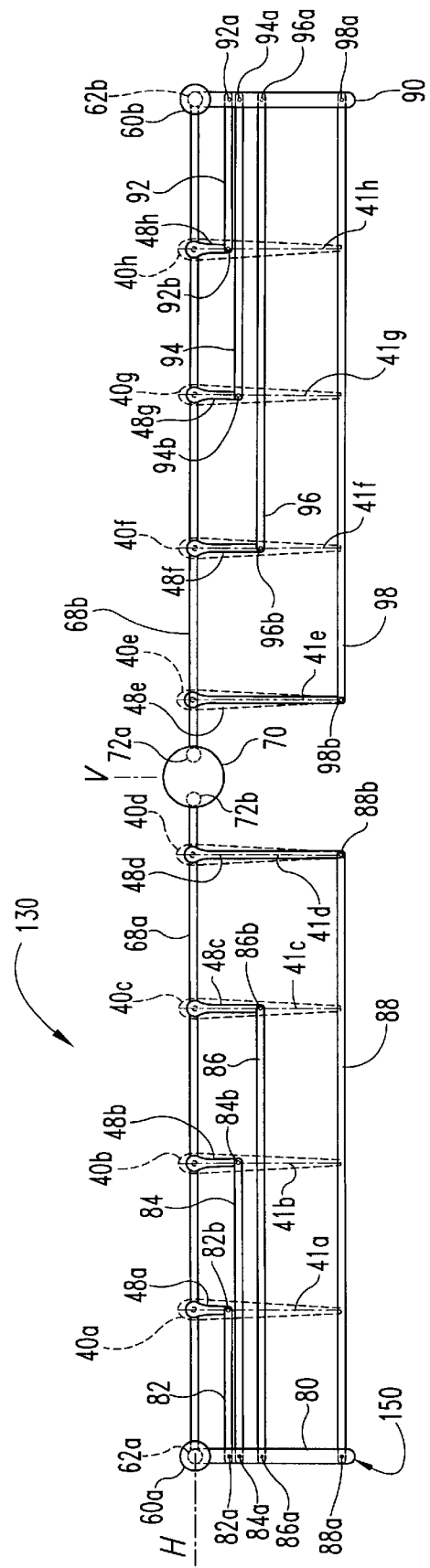
FIG. 3 is a diagrammatic side view of a portion of the embodiment shown in FIG. 2 illustrating the vanes in a first position in phantom.

Referring additionally to FIG. 3, as indicated by section line 3—3 of FIG. 2, each vane 40 has a corresponding chord line 41a, 41b, 41c, 41d, 41e, 41f, 41g, 41h (collectively referred to as chord lines 41) each illustrated as a dashed line segment. When chord lines 41 are generally parallel to vertical axis V, a neutral thrust vector results, which generally corresponds to vertical thrust parallel to arrow W. By pivoting vanes 40 by generally the same amount—such that the chords 41 remain generally parallel to each other—a non-neutral thrust vector results. FIG. 1 depicts working fluid directed from a path along arrow W to a path along arrow VM by vanes 40. Non-neutral thrust vector TV corresponds to the flow of working fluid along arrow VM. Preferably, vanes 40 have generally parallel rotational axes 46 and are evenly spaced apart from each other to form a cascaded guide vane bank. However, in alternative embodiments, the spacing and arrangements of vanes 40 may vary as would occur to one skilled in the art.

Vanes 40 are shown adjacent a mounting ring 38. Mounting ring 38 is contoured with a stair step pattern to assure a substantial portion of working fluid exiting outlet 34 passes between vanes 40. Preferably, vanes 40 may be pivoted so that the chord lines 41 are approximately parallel to the horizontal axis H (and approximately perpendicular to vertical axis V) to effectively close outlet 34 when not in use. It should be understood that outlet 34 and discharge passage 18 have a generally circular cross-section corresponding to the typical cross-section of a gas turbine engine. In other embodiments, a still different cross-sectional shape may be employed for the discharge passage or outlet.

FIG. 3 further illustrates control linkage 50 of thrust directing mechanism 30. Vanes 40 are represented in phantom in FIG. 3 because of the intervening portion of wall 36. Control linkage 50 includes control portions 44 of shaft 42 and crank arms 48a, 48b, 48c, 48d, 48e, 48f, 48g, 48h (collectively referred to as crank arms 48). Each crank arm 48 is rigidly attached to a corresponding control portion 44 at approximately a right angle.

Housing 52 has a wall 54 defining opposing slots 56a, 56b. Corresponding to slots 56a, 56b are actuators 60a, 60b engaged therein. Housing 52 is positioned to one side of passage 18. Preferably, housing 52 is counter-balanced by various aircraft components on the opposing side of passage 18. Each actuator 60a, 60b has a corresponding shaft 62a, 62b which is selectively rotated by activation of actuator 60a, 60b, respectively. Shaft 62a rotates about axis 64a, and shaft 62b rotates about axis 64b. Opposite each shaft 62a, 62b is a captive actuator lug 66a, 66b. Each captive actuator lug 66a, 66b slidingly engages slot 56a, 56b to permit selective positioning of actuator 60a, 60b therealong. Captive actuator lug 66a, 66b retains actuator 60a, 60b in a predetermined relationship to wall 54 regardless of position along corresponding slot 56a, 56b, respectively.

Each actuator 60a, 60b has transverse control rod 68a, 68b each connected to central actuator 70. Central actuator 70 is connected to transverse control rod 68a by pivot pin coupling 72a. Opposite pivot pin coupling 72a, is pivot pin coupling 72b which connects transverse control rod 68b to central actuator 70. Pivot pin couplings 72a, 72b have pivot axes 73a, 73b. Central actuator 70 is configured for selective rotation about axis 76.

Preferably axis 76 is positioned about midway between the pivot axes 73a, 73b.

Control link 80 is rigidly connected to shaft 62a so that it pivots about axis 64a when actuator 60a is activated. Control link 80 is pivotally coupled to each vane 40a, 40b, 40c, 40d by tie rod 82, 84, 86, 88, respectively. Each tie rod 82, 84, 86, 88 is pivotally attached to control link 80 by pivot pin 82a, 84a, 86a, 88a. Each tie rod 82, 84, 86, 88 is pivotally attached to crank arm 48a, 48b, 48c, 48d by corresponding pivot pin 82b, 84b, 86b, 88b.

Generally, pivot pins 82a, 84a, 86a, 88a lie along the length of rods 82, 84, 86, 88 opposite pivot pins 82b, 84b, 86b, 88b, respectively. Each of the tie rods 82, 84, 86, 88 has a different length corresponding to the spacing of control link 80 from each of vanes 40a, 40b, 40c, 40d, and the relative spacing between each of the vanes 40a, 40b, 40c, 40d with respect to each other. For the embodiment depicted, the length of rod 88>length of rod 86>length of rod 84>length of rod 82.

Likewise control link 90 is rigidly connected to shaft 62b so that is pivots about axis 64b when actuator 60b is activated. Control link 90 is pivotally coupled to each vane 40h, 40g, 40f, 40e by tie rod 92, 94, 96, 98, respectively. Each tie rod 92, 94, 96, 98 is pivotally attached to control link 90 by corresponding pivot pins 92a, 94a, 96a, 98a. Each tie rod 92, 94, 96, 98 is also pivotally attached to crank arm 48h, 48g, 48f, 48e by pivot pins 92b, 94b, 96b, 98b, respectively. Notably, each of the tie rods 92, 94, 96, 98 has a different length corresponding to the spacing of control link 90 from each of vanes 40h, 40g, 40f, 40e and the relative spacing between each of the vanes 40h, 40g, 40f, 40e with respect to each other. Specifically, the length of rod 98>length of rod 96>length of rod 94>length of rod 92.

Aircraft 10, thrust directing mechanism 30, control linkage 50, and housing 52 are made from conventional materials know to those skilled in the art. In one embodiment, these structures are predominately manufactured from metal. In other embodiments, selected composite materials may be preferred. When lift engine 20 is of the type discharging working fluid at an elevated temperature, it should be recognized that structure exposed to the hot discharge stream such as wall 36, mounting ring 38, vanes 40, shafts 42, and shaft bearings, will need to be constructed from materials appropriate for such elevated temperatures. In one embodiment, an appropriate combination of ceramic and metallic materials is preferred.

One mode of operating mechanism 30 is next discussed in connection with FIGS. 1–5, it being understood that other modes of operation are also contemplated as would occur to one skilled in the art. The "neutral vector" position of thrust directing mechanism 30 is generally depicted in FIGS. 2 and 3. This neutral vector generally corresponds to a vertical thrust vector parallel to axis V, which is typically desired at some point during vertical/short take off and vertical landing operations.

The vane orientation shown in FIGS. 1 and 4 corresponds to an intermediate thrust vector TV depicted by FIG. 1. Thrust vector TV includes substantial vertical and horizontal directional components along axes H and V, respectively. Frequently, this type of intermediate thrust vector TV is selected for transition from a take-off or landing mode to a cruise mode. In the cruise mode, aircraft 10 travels predominately along H axis and is preferably propelled by another thrust source (not shown).

Thrust vector TV is obtained by tilting or pivoting each of vanes 40 by about the same amount. From the perspective of FIG. 4, this orientation is accomplished by activating actuator 60a, 60b to rotate shaft 62a, 62b counter clockwise and to correspondingly turn control link 80, 90 about axis 64a, 64b.

With rotation of control link 80, each rod 82, 84, 86, 88 pivots about corresponding pivot pin 82a, 84a, 86a, 88a and pushes against corresponding crank arm 48a, 48b, 48c, 48d. In response to this pushing force, rods 82, 84, 86, 88 correspondingly rotate about pivot pins 82b, 84b, 86b, 88b, and turn crank arms 48a, 48b, 48c, 48d to pivot vanes 40a, 40b, 40c, 40d about axes 46a, 46b, 46c, 46d, respectively.

For rotation of control link 90, each rod 92, 94, 96, 98 pivots about corresponding pivot pin 92a, 94a, 96a, 98a and pulls on corresponding crank arm 48h, 48g, 48f, 48e. In response to this pulling force, rods 92, 94, 96, 98 correspondingly pivot about pivot pins 92b, 94b, 96b, 98b to turn crank arms 48h, 48g, 48f, 48e and pivot vanes 40h, 40g, 40f, 40e about axes 46h, 46g, 46f, 46e, respectively.

In this manner, selective rotation of control links 80, 90 with actuators 60a, 60b, respectively, provide vectoring of vanes 40 by a tandem rotation of each of vanes 40 by about the same amount. For example, by rotating each control link 80, 90 clockwise past the straight neutral vector (opposite the direction rotated as shown in FIGS. 1 and 4), a vector with a horizontal directional component opposing the horizontal component of thrust vector TV may be obtained. Furthermore, by rotating control links 80, 90 toward each other (rotating control link 80 counter clockwise and control link 90 clockwise), a convergent pattern may be provided about axis V. Similarly, by rotating control links 80, 90 away from each other (rotating control link 80 clockwise and control link 90 counter clockwise), a divergent pattern may be obtained with respect to axis V. By controlling the convergent/divergent pattern of vanes 40, discharge throat area presented to the working fluid may be controlled.

FIG. 5 illustrates one preferred method to converge the vanes to control throat area. The vane pattern of FIG. 5 has the outermost vanes (40a, 40h) with the greatest pivot angle in relation to axis V and the innermost vanes (40d, 40e) with the smallest pivot angle relevant to axis V. The remaining vanes 40b, 40c, 40F, 40g have a pivot angle between these extremes. This angular difference from vane to vane generally provides more efficient nozzle performance compared to systems which can only adjust throat area by turning the vanes the same amount.

The multiple angle convergent pattern is obtained by rotating central actuator 70 about axis 76 (approximately 90 degrees for the embodiment depicted in FIG. 5). In response, transverse control rods 68a, 68b move closer to each other, pivoting about pivot axes 74a, 74b. Also, repositioning of transverse control rods 68a, 68b by activation of central actuator 70 pulls actuators 60a, 60b closer together, sliding them along slots 56a, 56b, respectively. By controlling the amount of rotation of central actuator 70, the degree of convergence can also be controlled. The control links 80, 90 may maintain a generally parallel orientation to axis V when a neutral vector with an adjusted throat area is desired.

With actuator 60a, 60b approaching each other, rods 82, 84, 86, 88 push on crank arms 48a, 48b, 48c, 48d and correspondingly rotate about pivot pins 82b, 84b, 86b, 88b. Accordingly, vanes 40a, 40b, 40c, 40d rotate to different pivot angles. The pivot angle of each of vanes 40a, 40b, 40c, 40d is a function of the distance between the pivot point for each of pivot pins 82b, 84b, 86b, 88b and rotational axes 46a, 46b, 46c, 46d. The pivot angle A is shown for vane 40a relative to chord line 41a and an axis parallel to axis V which perpendicularly intersects axis 46a. The pivot angle for the remaining vanes 40 would be similarly obtained with respect to axis V. The shorter the distance between the pivot pin 82b, 84b, 86b, 88b and the rotational axis 46a, 46b, 46c, 46d, the greater the angular sweep of the corresponding vane 40a, 40b, 40c, 40d in response to translational movement of actuator 60a and control link 80 toward actuator 60b and control link 90 along horizontal axis H.

Due to the symmetry of control linkage 50 about axis V, translational motion of actuator 60b and crank link 90 as determined by actuation of central actuator 70, results in vanes 40h, 40g, 40f, 40e having an approximate "mirror image" angular position relative to vanes 40a, 40b, 40c, 40d.

Notably, the convergent pattern may be obtained by rotating central actuator 70 in either a clockwise or counter clockwise direction by the same amount from a neutral position corresponding to that shown in FIGS. 3 and 4. Also, various combinations of vectoring and desired throat area may be obtained by selectively rotating control links 80, 90 in conjunction with activation of central actuator 70. Thus, thrust directing system 30 generally provides a way to control thrust vectoring and nozzle throat area with vanes 40 by selectively positioning control links 80, 90.

In another embodiment, control linkage 50 may be reconfigured to provide a divergent pattern as well as a convergent pattern by adjusting the tie rods to provide a divergent pattern when control actuator 70 is in the neutral position of FIGS. 3 and 4. As central actuator 70 of such a modified linkage is rotated from this neutral position by a first amount it will correspondingly rotate vanes 40 to a neutral vector position. By rotating central actuators 70 with this modified linkage a second amount greater than the first amount it will reconfigure vanes 40 into a convergent position.

FIG. 6A depicts thrust mechanism 330 of a second embodiment of the present invention in a partial cross-sectional view. Like FIG. 2, the view plane of FIG. 6A corresponds to a cross-sectional plane through discharge passage 318 which is generally perpendicular to the direction of working fluid flowing therethrough. Discharge passage 318 has corresponding discharge outlet 334 and four walls 336a, 336b, 336c, 336d (collectively designated walls 336) oriented to present a generally rectangular cross-sectional shape of passage 318 and outlet 334. Vanes 340 are generally evenly spaced apart from one another across outlet 334 along longitudinal axis L of outlet 334.

Each vane 340 has a corresponding mounting shaft 342 with pivot axis 346. Each pivot axis 346 is generally perpendicular to axis L. Each shaft 342 passes through wall 36a and has a corresponding control portion 344. Journaling of shafts 342 to opposing walls 336a and 336c is comparable to journaling of shafts 42 to aircraft 10 in FIG. 2. Each control portion 344 interfaces to a control linkage configured similar to control linkage 50 illustrated in FIG. 2. However, unlike the embodiment of FIG. 2, vanes 340 each have about the same length and shape in the embodiment of FIG. 6A. Also, mechanism 330 does not preferably include structure comparable to mounting ring 38 of FIG. 2. Discharge passage 318 may be provided by transitioning from the generally circular cross-sectional shape common to the exit of many gas turbine engines and lift fans to the rectilinear shape presented. Alternatively, the rectangular shape of passage 318 may be included as part of a separable nozzle device that has a transitional portion (not shown) configured to mate with working fluid passages of various cross-sectional shapes.

Figure 6B:
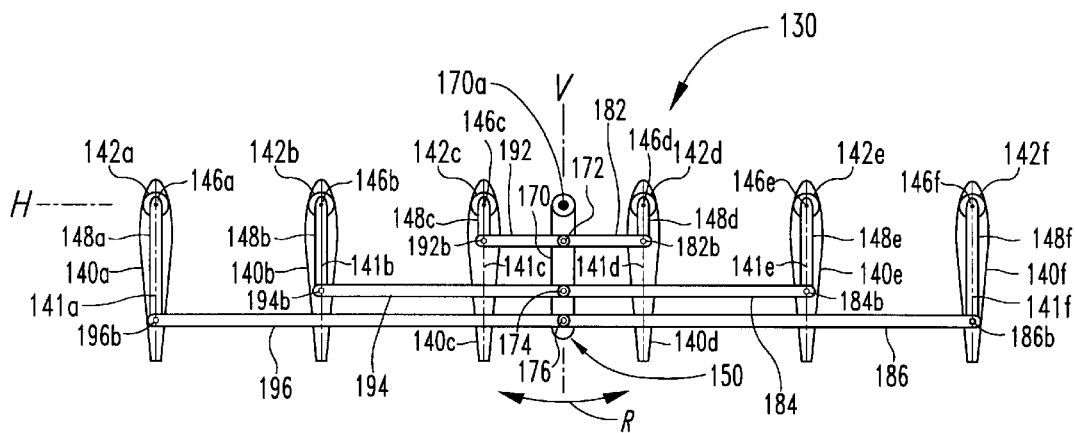
FIG. 6B is a diagrammatic side view of a third embodiment of the present invention including guide vanes illustrated in a first position.
Figure 7:
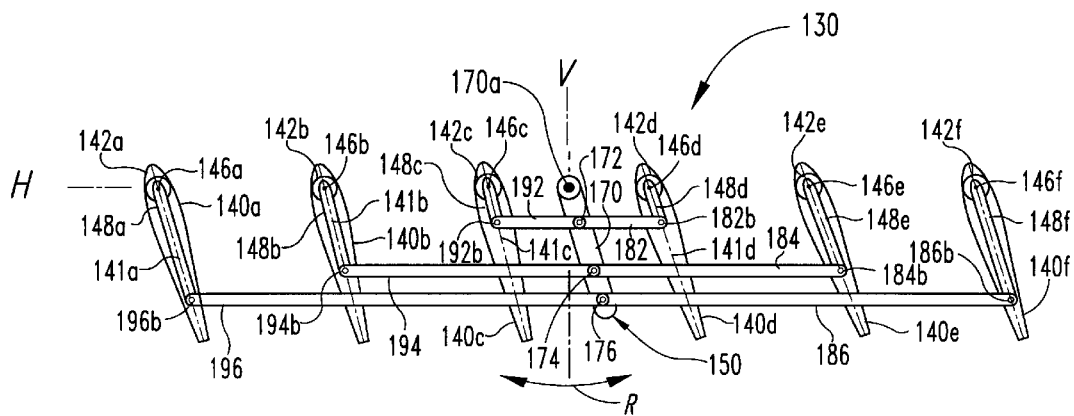
FIG. 7 is a diagrammatic side view of the embodiment shown in FIG. 6B with the vanes shown in a second position.
Figure 8:
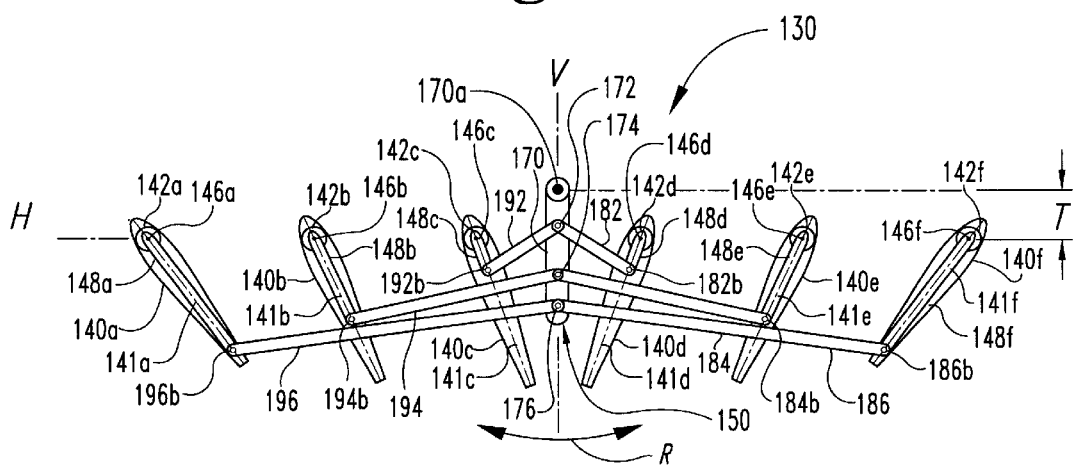
FIG. 8 is a diagrammatic side view of the embodiment shown in FIG. 6B with the vanes shown in a third position.

FIGS. 6B, 7, and 8 depict a diagrammatic side view of a third embodiment of the present invention, as thrust directing mechanism 130. Thrust directing mechanism 130 includes vanes 140a, 140b, 140c, 140d, 140e, 140f (collectively designated vanes 140).

Vanes 140 are shown with a generally airfoil shaped cross section preferably configured to maximize thrust directing efficiency. The flow of working fluid is generally parallel to axis V. Furthermore, it should be noted that thrust directing mechanism 130, as presented in FIGS. 6B, 7, and 8, is generally symmetric about a plane perpendicular to the plane of view and containing axis V.

Vanes 140 have corresponding chord lines 141a, 141b, 141c, 141d, 141e, 141f (collectively designated chord lines 141) illustrated as a dashed line segment. Vanes 140 are preferably positioned span wise across a working fluid discharge pathway to direct fluid flow as it is discharged. Furthermore, vanes 140 are preferably configured in a cascade arrangement.

Vanes 140 are each pivotally mounted by a corresponding shaft 142a, 142b, 142c, 142d, 142e, 142f (collectively designated shafts 142) so that they rotate about axes 146a, 146b, 146c, 146d, 146e, 146f (collectively designated axes 146), respectively. Axes 146 are perpendicular to the view plane of FIGS. 6B, 7, and 8; and are thus shown as pivot points. Vanes 140 each have a rigidly connected crank arm 148a, 148b, 148c, 148d, 148e, 148f (collectively designated crank arms 148) which interface with control linkage 150.

Control linkage 150 includes a control link 170 configured for selective positioning. Control link 170 has a pivot pin 172 pivotally connecting tie rod 182 to control link 170 and tie rod 192 to control link 170. Generally, tie rod 182 opposes tie rod 192. Pivot pin 182b rotatably attaches tie rod 182 to crank arm 148d; thus pivotally coupling control link 170 and vane 140d. Likewise, pivot pin 192b couples rod 192 to crank arm 148c.

Pivot pins 174, 176 pivotally connect opposing tie rods 184, 194 and 186, 196, respectively, to control link 170. Pivot pins 184b, 194b, rotatably attach rods 184, 194 to crank arms 148e, 148b, respectively. Pivot pins 186b, 196b rotatably attach rods 186, 196 to crank arms 148f, 148a, respectively.

Preferably, control link 170 is configured for selective movement by one or more actuators using techniques known to those skilled in the art. Control link 170 is configured to move with at least two degrees of freedom. One degree of freedom of motion corresponds to translational motion of control link 170 along axis V. Another degree of freedom of motion corresponds to rotational motion of control link 170 about pivot point 170a and along path R.

Vanes 140 of FIG. 6B are illustrated in approximately non-convergent neutral vector positions. FIG. 7 shows a non-neutral thrust vector position of vanes 140 obtained by rotating control link 170 counterclockwise about pivot point 170a. In this position, each of vanes 140 has about the same pivot angle with respect to axis V; where the pivot angle is determined between chord line 141 and a line parallel to axis V for each of vanes 140, respectively. Vanes 140 are turned the same amount for a desired thrust vector in accordance with rotational position of control link 170 about pivot point 170a.

FIG. 8 illustrates a convergent orientation of vanes 140 obtained by moving control link 170 along axis V a distance T. The convergent pattern of vanes 140 have varying pivot angles similar to the pattern obtained by thrust directing mechanism 30 in FIG. 5 of the previously discussed embodiment. This pattern is adjusted in a similar manner by the pivotally linked rods 82, 84, 86, 92, 94, 96. The convergent pattern of FIG. 8 provides generally better thrust efficiency than a convergent pattern with uniform pivot angles. In further resemblance to the embodiment of FIG. 5, the pivot angles vary as a function of the distance between the pivotal connections at pins 182b, 192b, 184b, 194b, 186b, 196b and the corresponding rotational axes 146. Notably, in other embodiments, control link 170 and rods 182, 184, 186, 192, 194, 196 may be reconfigured to provide a selectable divergent pattern as an alternative or in addition to the convergent pattern illustrated in FIG. 8.

Referring generally to the embodiments of FIGS. 1–8, a few features of the present invention are further discussed. Control links 80, 90, 170 are each configured to move with two degrees of freedom. A two coordinate position generally corresponds to the two degrees of freedom of each control link. For the embodiments illustrated, a thrust vector generally corresponds to a given position of the control link along a rotational path—a first positional coordinate; and convergence (or divergence) generally corresponds to position of the control link along a translational path—the second positional coordinate. Each control link is pivotally coupled to several guide vanes by corresponding linkage. Generally, a desired thrust vector and convergent pattern may be mapped as a function of these two coordinates. Notably, a given control link may have a limited range for either or both of the coordinates. For alternative embodiments offering a divergent orientation either as an alternate or an addition to a convergent orientation, a similar two coordinate mapping may be used to activate one or more appropriate actuators to position corresponding control links and rotate pivotally coupled vanes to a desired orientation.

In other embodiments, various types, shapes, and quantities of control links may be used as occurred to one skilled in the art. These alternative control links may include utilization of two different paths or degrees of freedom of motion. Furthermore, the general correspondence of a desired thrust vector to one positional coordinate and convergence (or divergence) to another positional coordinate may not be utilized in some alternative embodiments.

Also, a different type of linkage arm besides tie rods 82, 84, 86, 88, 92, 94, 96, 98, 182, 184, 186, 192, 194, 196 may be used as would occur to one skilled in the art. Furthermore, it should be appreciated that the linkage may be reconfigured to accommodate special arrangements concerning housing of the thrust directing mechanism. Furthermore, more or less linkage components between the vanes and control link(s)

may be used. Also, it should be noted that the thrust directing mechanism of the present invention avoids placement of the control linkage in the discharge passage. This advantage is particularly relevant when a hot gas working fluid is utilized because it permits greater freedom in choosing linkage materials.

In one alternative embodiment, the thrust directing mechanism is provided as part of a separable, external nozzle which is coupled to an aircraft. The present invention may also be combined with various other thrust vectoring systems known to those skilled in the art. Also, more or less vanes than those of the illustrated embodiments may be employed.

Figure 9:
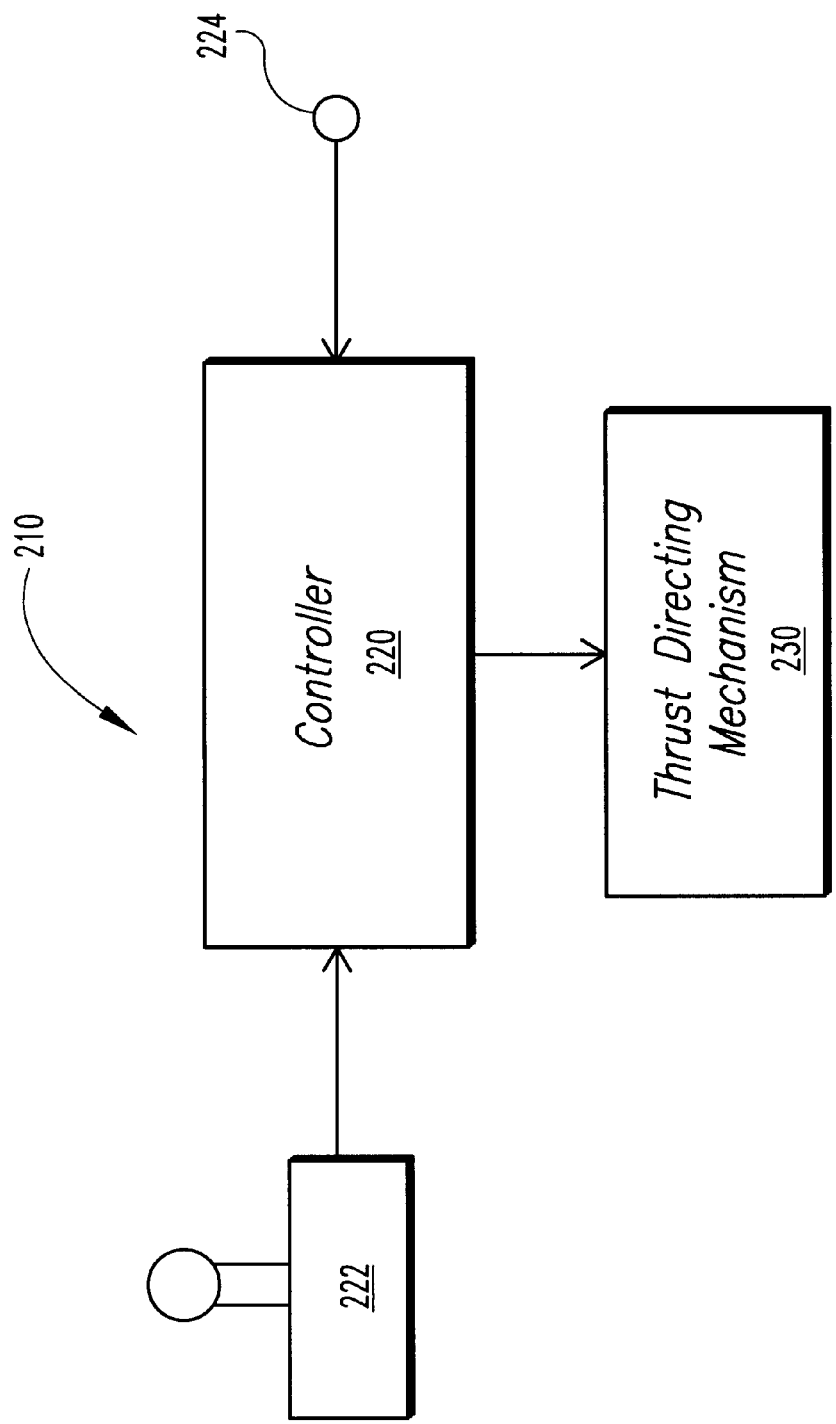
FIG. 9 is a schematic illustration of a control system of a fourth embodiment of the present invention.

Referring to FIG. 9, an embodiment of an airborne thrust control system 210 for an aircraft is shown for use with a thrust directing mechanism 230 of the present invention. Thrust directing mechanism 230 may be substantially the same as thrust directing mechanism 30 or 130, a combination thereof, or a modified version within the spirit of the present invention. Thrust directing mechanism 230 includes an actuation system responsive to signals from controller 220. This actuation system includes one or more actuators which may be hydraulic, pneumatic, electromagnetic, or such other type of actuation system as would occur to one skilled in the art. The actuation system is used to selectively position one or more control links of thrust directing mechanism 230 having at least two degrees of freedom. The one or more control links are pivotally coupled to variable pitch vanes of thrust directing mechanism 230 to control thrust vectoring and throat area as a function of a two coordinate position corresponding to the minimum two degrees of freedom of motion.

Controller 220 is also operatively coupled to a pilot control stick 222 and sensors 224. Controller 220 is configured to respond to one or more steering signals from control stick 222 corresponding to a desired directional heading of an aircraft. Also, controller 220 is configured to monitor aircraft position from aircraft sensors 224. These sensors provide position signals corresponding to current and desired aircraft position necessary for continued, stable operation of the aircraft. For example, position signals may correspond to the degree to which the aircraft is level, such as pitch and roll positions of the aircraft. Generally, the steering signals and the position signals may include without limitation, information relating to aircraft speed, acceleration, weight, balance, threat avoidance, and positional information relating to the six possible degrees to freedom of motion common to an aircraft.

Controller 220 is configured to determine a desired orientation of the vanes of thrust directing mechanism 230 from a thrust control signal. This desired orientation may include a given thrust vector, degree of convergence or divergence, or a combination of both. The thrust control signal may be a function of one or more steering signals, position signals, or a combination of both. The desired vane orientation is determined as a function of the thrust control signal and the two coordinate position of the one or more control links of thrust directing mechanism 230. The controller provides an actuation signal in accordance with the desired orientation to actuate the actuation system of thrust directing mechanism 230. The actuation system responds to the actuation signal to correspondingly pivot the vanes to the desired orientation.

Controller 220 may be a single unit, or a collection of operatively coupled units on board the aircraft. Also, controller 220 may be an electronic circuit comprised of one or more components. Similarly, controller 220 may be comprised of digital circuitry, analog circuitry, or both. Also, controller 220 may be programmable, an integrated state machine, or a hybrid combination thereof.

Sensors 224 may provide a signal in either a digital or analog format compatible with associated equipment. Correspondingly, equipment coupled to sensors 224 is configured to condition and convert sensor signals to the appropriate format, as required. All sensors 224 are of type known to those skilled in the art.

Figure 10:
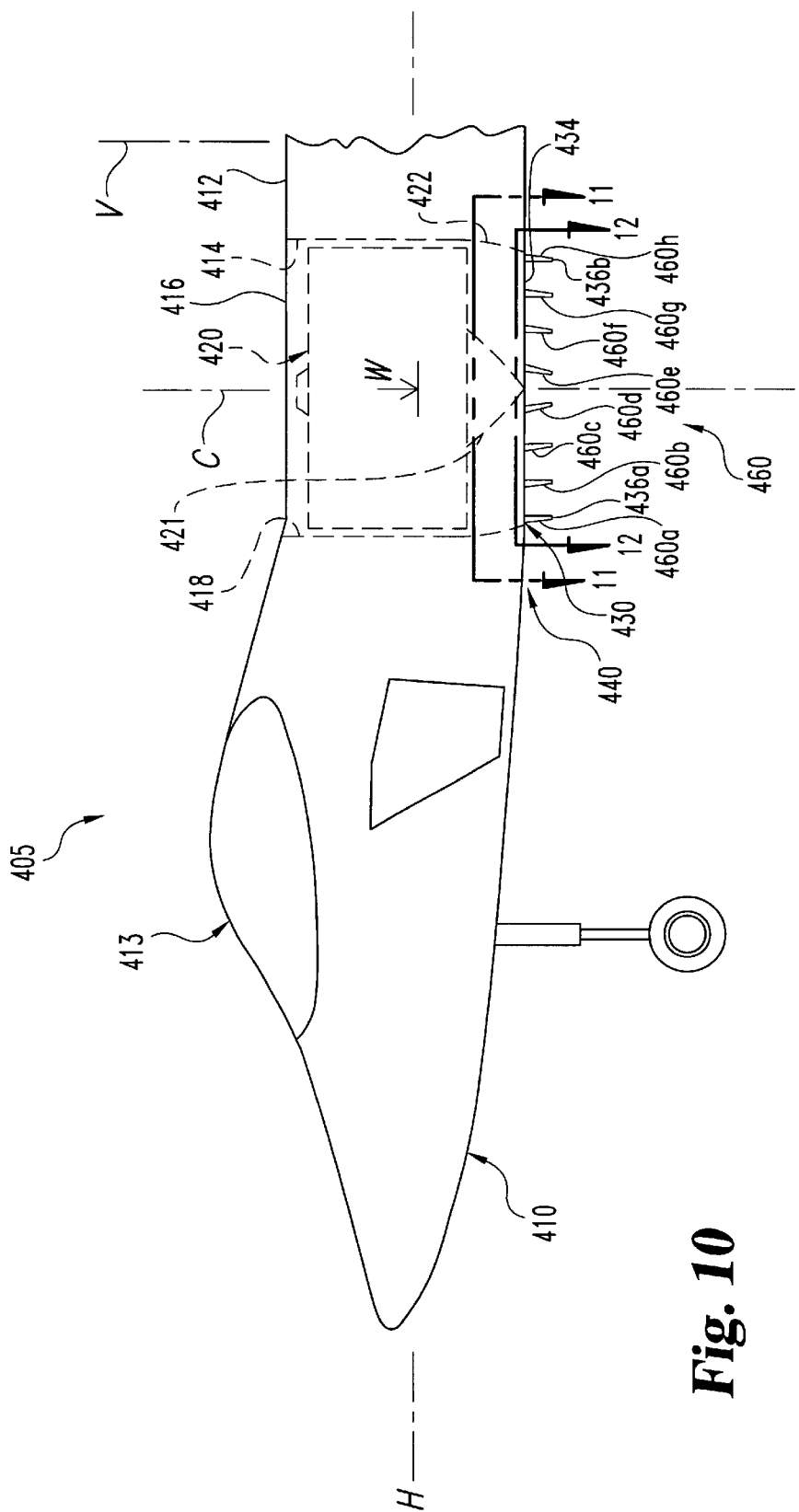
FIG. 10 is a partial, diagrammatic view of an aircraft with thrust vectoring guide vanes of a fifth embodiment of the present invention.

FIG. 10 illustrates system 405 of another embodiment of the present invention. System 405 includes aircraft 410 having fuselage 412 and cockpit 413. Aircraft 410 is shown relative to a nominal vertical axis V and horizontal axis H in FIG. 10. An aft portion of aircraft 410 is not shown, being of a conventional nature such as the aircraft shown in U.S. Pat. Nos. 5,209,428 to Bevilaqua et al. or U.S. Pat. No. 5,769,317 to Sokhey et al.

Fuselage 412 defines passage 414. Passage 414 has intake portion 418 with inlet 416. Working fluid source 420 is shown in phantom in passage 414 below intake portion 418. Preferably, working fluid source 420 is of the lift fan variety that is remotely driven by a power plant such as a gas turbine engine (not shown) of aircraft 410 to provide a "cold flow" working fluid to produce thrust. In other embodiments, a different working fluid source 420, such as a gas turbine engine producing a "hot flow" of exhaust gases to produce thrust, or other working fluid generation device may be utilized as would occur to those skilled in the art.

Working fluid source 420 is shown with a centerbody 421 (also in phantom) extending downward into discharge portion 422 of passage 414. Centerbody 421 is of a generally conical shape with a generally circular cross section taken along centerline axis C of working fluid source 420. Notably, centerline axis C is generally parallel to vertical axis V for the position of aircraft 410 shown in FIG. 10. Discharge portion 422 terminates at outlet 434 of nozzle 440. Nozzle 440 includes thrust directing mechanism 430. Mechanism 430 includes a number of variable pitch vanes designated by reference numerals 460a–460h. Vanes 460a–460h are additionally designated as belonging to a set of working fluid directing members 460 of mechanism 430. Vanes 460a–460h are shown in a generally convergent pattern about axis C in FIG. 10.

Figure 11:
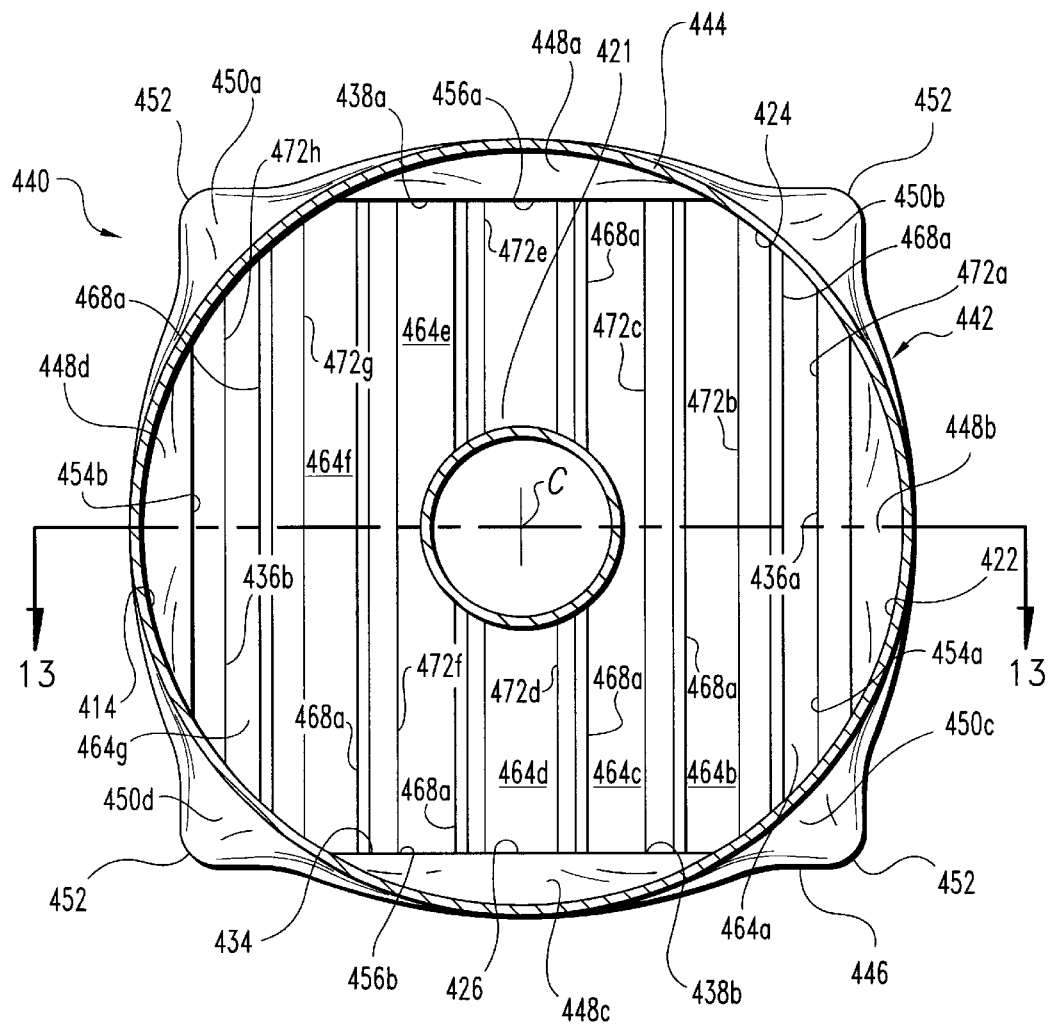
FIG. 11 is a partial, sectional view of the embodiment of FIG. 10 taken along section line 11—11 of FIG. 10.

Referring additionally to FIG. 11, discharge portion 422 of passage 414 has a generally circular outer profile 424 of a cross section taken at a point along axis C farthest away from outlet 434. Axis C is perpendicular to the view plane of FIG. 11 and is represented by a cross-hair. The outer profile gradually transitions to a generally rectangular, and preferably approximately square profile 426 at a point further down axis C toward outlet 434. The transition from the circular profile 424 to rectangular profile 426 is provided by a transitional duct section 442. Transitional section 442 has a generally circular wall portion 444 defining the corresponding profile 424 adjacent working fluid source 420 and multisided wall portion 446 defining generally rectangular profile 426 adjacent outlet 434. Transitional section 442 includes converging wall regions 448a–448d and diverging wall regions 450a–450d. Wall regions 448a, 448b are sloped to converge towards wall regions 448c, 448d, respectively, as outlet 434 is approached along axis C. Diverging wall regions 450a, 450b are positioned opposite diverging wall regions 450c, 450d, respectively, and are sloped to diverge with respect to wall regions 450c, 450d as outlet 434 is approached along axis C. Each diverging wall region 450a, 450b includes a tightly rounded or radiused corner 452 to define a generally square margin at outlet 434.

Figure 12:
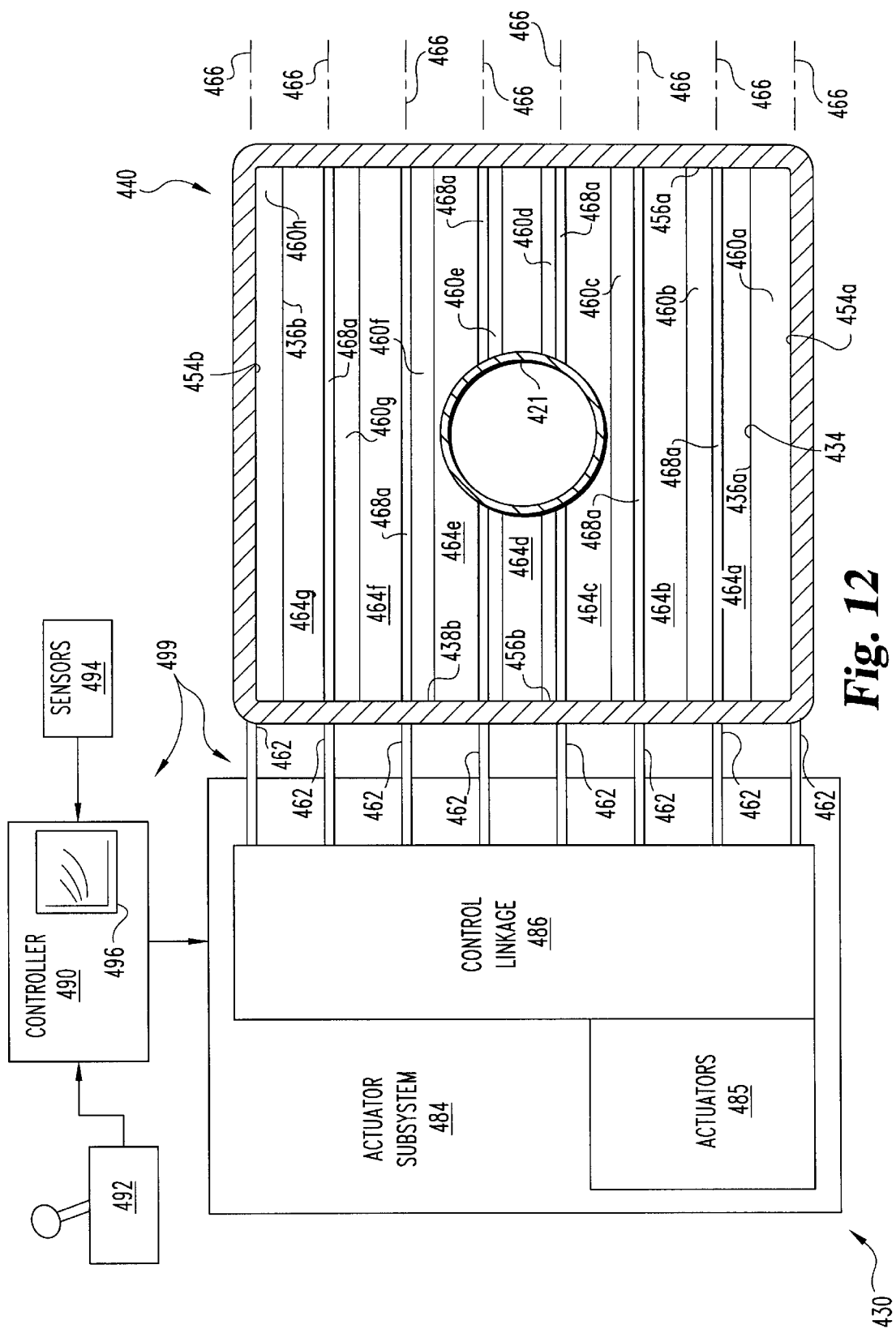
FIG. 12 is a partial, diagrammatic sectional view of the embodiment of FIG. 10 taken along section line 12—12 of FIG. 10.
Figure 13:
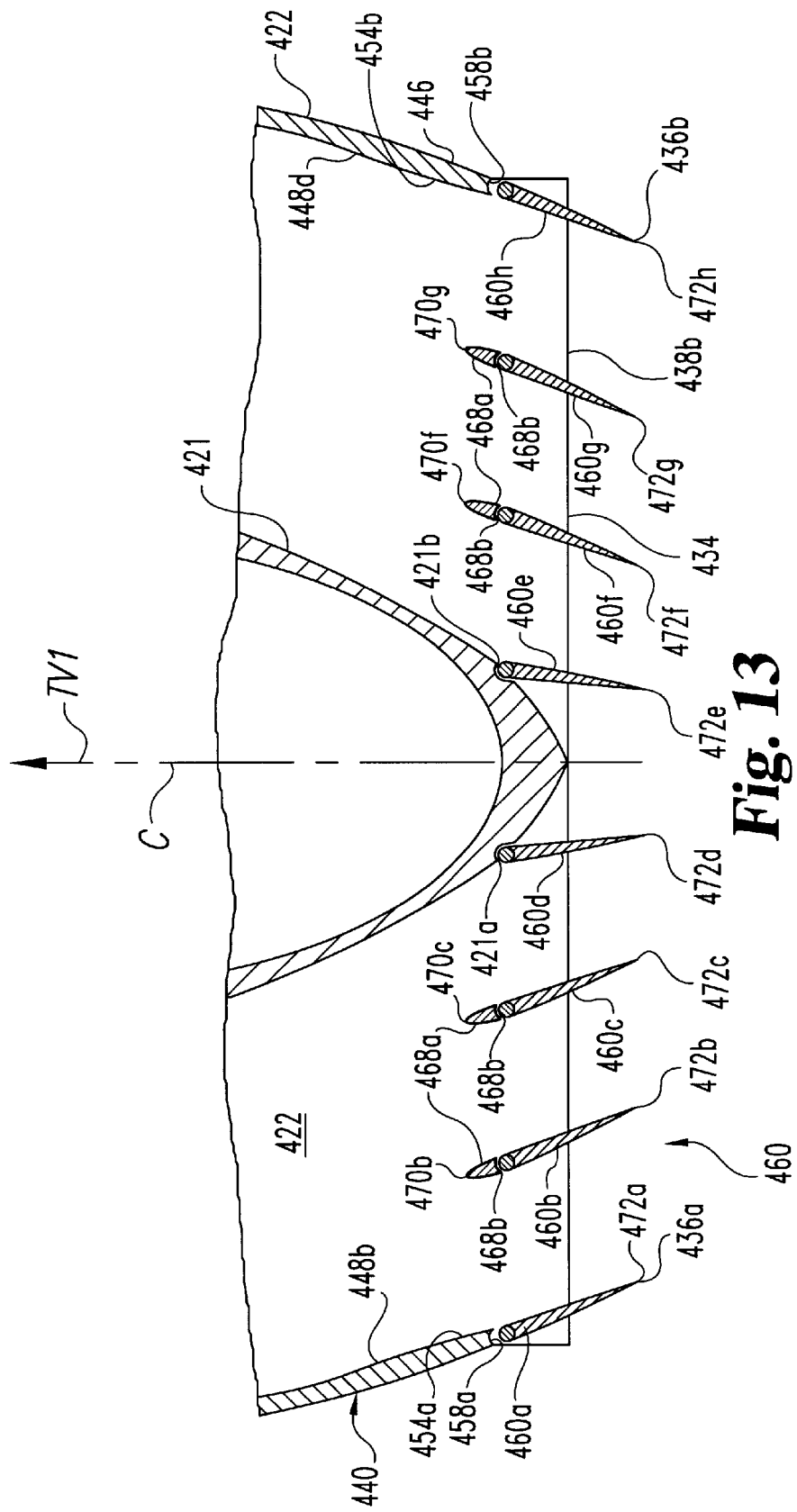
FIG. 13 is a partial, side sectional view of the embodiment shown in FIG. 11 taken alone section line 13—13 of FIG. 11.

Referring also to FIGS. 12 and 13, vanes 460a–460h are generally positioned across outlet 434 to extend from passage side 456a to 456b; where sides 456a, 456b are positioned generally opposite each other. A portion of each of vanes 460a–460h is connected to a corresponding control shaft 462 to turn or pivot about a corresponding rotational axis 466 as best illustrated in FIG. 12. Shaft 462 of each vanes 460a–460h is journaled to nozzle 440.

Vanes 460a–460h are generally evenly spaced apart from one another with each corresponding rotational axis 466 being generally parallel to the others and to passage sides 454a, 454b; where sides 454a, 454b are positioned generally opposite each other. Discharge spaces 464a–464g of outlet 434 are defined between adjacent pairs of members 460 as illustrated in FIGS. 11 and 12. Nose caps or leading edge caps 468a are provided to define a corresponding leading edge 470b–470g for each corresponding vane 460b–460g. Caps 468a are also alternatively designated as fluid directing members 460. Preferably caps 468a are each secured or fixed to one or more walls or surfaces defining passage 414. It is also preferred that end caps 468a be aligned in a converging pattern relative to axis C. However, in other embodiments, caps 468a may be configured to pivot or otherwise move relative to the walls or surfaces defining passage 414, and may also pivot or move relative to vanes 460a–460h.

Vanes 460b–460g articulate relative to caps 468a, each having a head portion nested in a recess 468b defined by a respective one of caps 468a. For vanes 460d, 460e, caps 468a extend on either side of centerbody 421 to sides 456a, 456b. Also, vanes 460d, 460e are each nested in corresponding recesses 421a, 421b of centerbody 421 as illustrated in the partial cross-sectional view of FIG. 13. Vanes 460a, 460h are nested in recesses 458a, 458b formed at the termination of wall portion 446.

Outlet 434 has an edge defining generally straight boundary 436a opposite an edge defining generally straight boundary 436b. Further, outlet 434 has an edge defining generally straight boundary 438a opposite an edge defining generally straight boundary 438b. Boundaries 436a, 436b are generally perpendicular to boundaries 438a, 438b. Notably, boundaries 436a, 436b are defined by vanes 460a and 460h, respectively. Vanes 460a, 460b are aligned with opposing sides 454a, 454b to effectively extend the sides of passage 414. Vanes 460a–460h have trailing edges 472a–472h, respectively.

Figure 14:
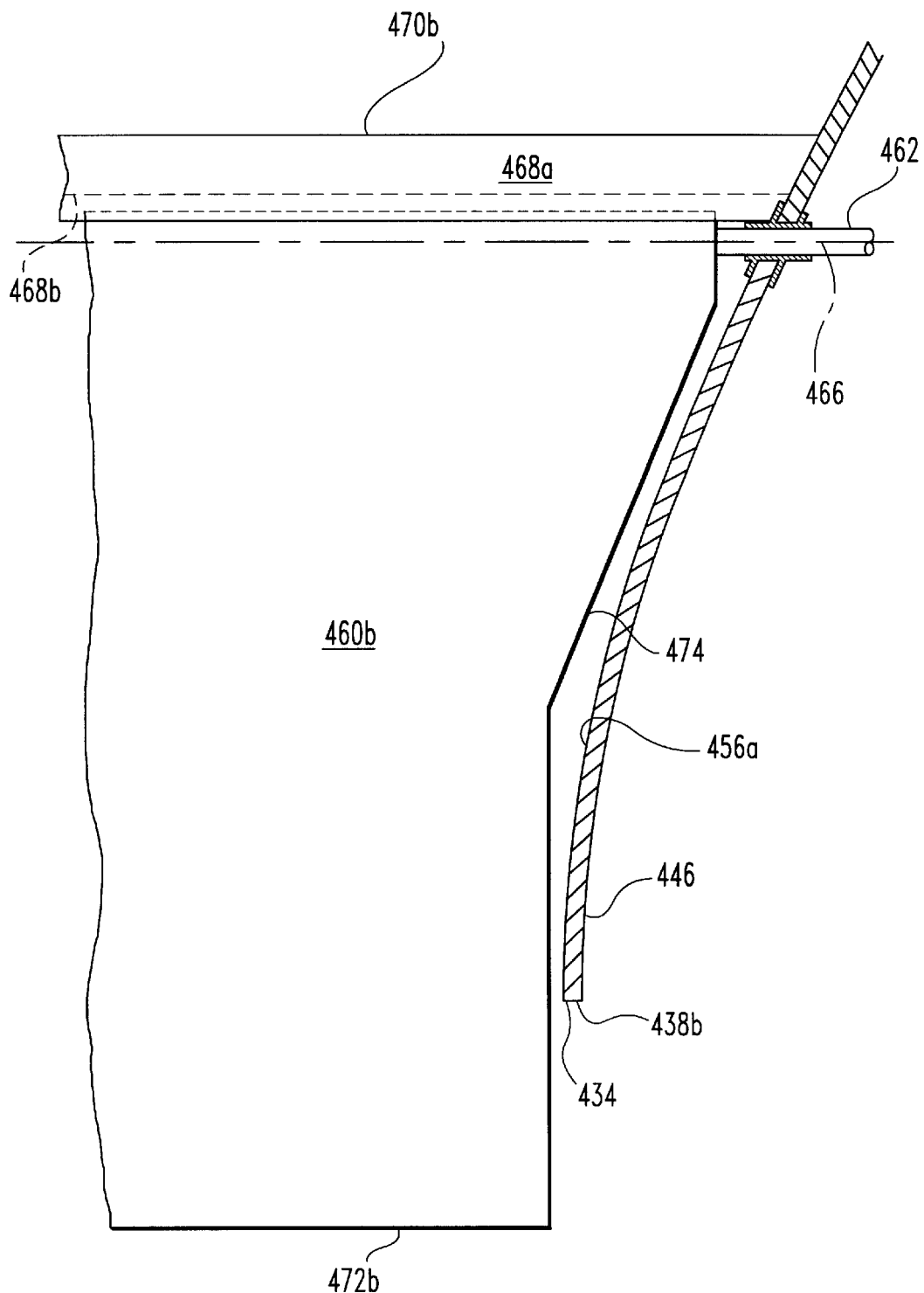
FIG. 14 is a partial, sectional view of a vane of the embodiment of FIG. 10 with a view plane that is perpendicular to the view plane of FIG. 10 and parallel to centerline axis C.

Referring to FIG. 14, additional details about vanes 460b–460g are disclosed. Although only a partial view of vane 460b is provided in FIG. 14, like structure is preferred for vanes 460c–460g. The view plane of FIG. 14 is oriented perpendicular to the view plane of FIG. 13 and is also parallel to centerline axis C. Vane 460b has contoured side edge 474 to maintain a close spacing with side 456a. The head of vane 460b is shown in phantom in recess 468b of leading edge cap 468a. Cap 468a is also shown abutting side 456a. Control shaft 462 of vane 460b extends through side 456a of passage 414 to actuation subsystem 484 shown in FIG. 12; however, subsystem 484 has not been shown in FIG. 14 to preserve clarity. Preferably, vanes 460c–460g have corresponding contoured side edges 474 configured to conform to the slope of side 456b. It is also preferred that the opposing end of vanes 460b–460g be oriented relative to sidewall 456b with a contoured side edge that is generally a mirror image of edge 474 about a plane of symmetry that intersects the midpoint of the corresponding one of vanes 460b–460g and is perpendicular to its longitudinal axis.

The utilization of contoured side edges 474 for vanes 460b–460g and the articulated extension of sides 454a, 454b by vanes 460a, 460h, respectively, provides a low leakage, generally rectangular nozzle throat that may be adjusted by pivoting vanes 460a–460h. In other embodiments, vanes or working fluid directing members need not have a contoured side edge, or may have differently shaped and spaced edges as would occur to those skilled in the art. Further, in alternative embodiments, the nozzle need not terminate or transition to a generally square, or rectangular shape; instead having variously shaped profiles as would occur to those skilled in the art. Also, in other embodiments, vanes 460a–460h need not be nested in recesses, be generally evenly spaced apart, or have generally parallel rotational axes. Further, vanes may be positioned so as not to span across the outlet in the region occupied by a centerbody, or alternatively may be journaled to the centerbody. Indeed, one alternative embodiment lacks a centerbody.

Referring to FIG. 12, shafts 462 of vanes 460a–460h are operatively coupled to actuation subsystem 484. Actuation subsystem 484 includes one or more controllable actuators 485. Subsystem 484 also includes control linkage 486. Control linkage 486 preferably includes control linkage 50 or control linkage 150 of the previously described embodiments coupling shafts 462 to the actuators to adjust the degree of convergence or divergence of vanes 460a–460h and synchronize turning of vanes 460a–460h in a common rotational direction. Alternatively, linkage 486 may utilize a different arrangement as would occur to those skilled in the art. Indeed, in one embodiment, each vane 460a–460h has a different actuator to turn its corresponding shaft 462 and control its rotational position independent of the other vanes 460a–460h. For this alternative embodiment, it is envisioned that each shaft would be directly attached to its corresponding actuator with little or no intervening control linkage.

The one or more actuators 485 are also operatively coupled to controller 490. Controller 490 provides one or more control signals to actuation subsystem 484 to adjust and set a selected pivotal orientation of each of vanes 460a–460h in accordance with schedule 496. Controller 490 is coupled to receive inputs from pilot control 492 and one or more sensors 494. Collectively, actuation subsystem 484, controller 490, control 492, and sensors 494 provide vectoring control system 499. Control system 499 regulates and adjusts the thrust vectoring provided with mechanism 430 in response to one or more conditions input by control 492 or sensed with sensors 494. Subsystem 484, controller 490, control 492, and sensors 494 are schematically represented in FIG. 12. Preferably, the structural component or components corresponding to reference numerals 484, 490, 492, and 494 are dispersed within aircraft 410 as would occur to those skilled in the art, it being understood that the dimensional and positional relationships of FIG. 12 are for convenience of illustration only.

Referring generally to FIGS. 10–17, the operation of system 405 is next described. For system 405 as shown, working fluid source 420 is preferably only activated for V/STOVL modes of operation of aircraft 410, as further discussed in connection of aircraft 10 shown in FIG. 1. In other embodiments, passage 414, source 420, and nozzle 440 may be arranged using techniques known to those skilled in the art to additionally or alternatively provide for thrust control when operating aircraft 410 in a cruise mode or other operating mode. When system 405 is operating, air enters through inlet 416 and travels along intake portion 418 of passage 414 to working fluid source 420 to be compressed. Source 420 then discharges working fluid under a substantially greater pressure in the direction indicated by arrow W to produce thrust to propel aircraft 410 in a direction generally opposite the working fluid. As in the case of mechanisms 30, 130, 230, and 330 of the previously described embodiments; mechanism 430 vectors thrust by deflecting working fluid as it exits outlet 434 with members 460.

Further, it has been found that the ability to vary throat area for thrust modulation and to adjust for temperature changes at idle may affect operability of the engine to which the nozzle is attached. For instance, the exit area variation of a choked nozzle affects operational bounds, such as stall margin of a gas turbine engine, when such an engine is used as source 420. Thus, it is desirable to maintain nozzle exit area while the engine is operating at a constant design speed. At this design point, it is preferred that vanes 460a–460h slightly converge in a generally symmetric pattern about axis C when providing a neutral or nominal vector direction parallel with axis C as represented by arrow TV1. Furthermore, the leading edge caps 468a are preferably fixed in a convergent pattern about axis C corresponding to the neutral vector. Accordingly, for this preferred embodiment, edge caps 468a slightly turn working fluid as it passes through nozzle 440. Nonetheless, in other embodiments, caps 468a may be arranged in different configurations or may be absent. For the given arrangement of directing members 460, it is preferred that the degree of flow be maximized for a given set of total conditions such as total pressure and total temperature in the nozzle exit area. Correspondingly, an increase in nozzle exit area would reduce nozzle pressure and result in a drop in thrust. Thus, thrust may be decreased by diverging or splaying the vanes to rapidly increase exit area.

To change thrust direction, at least some of vanes 460a–460h are pivoted about the corresponding axes 466 by control system 499 from the vector represented by arrow TV1.

Figure 15:
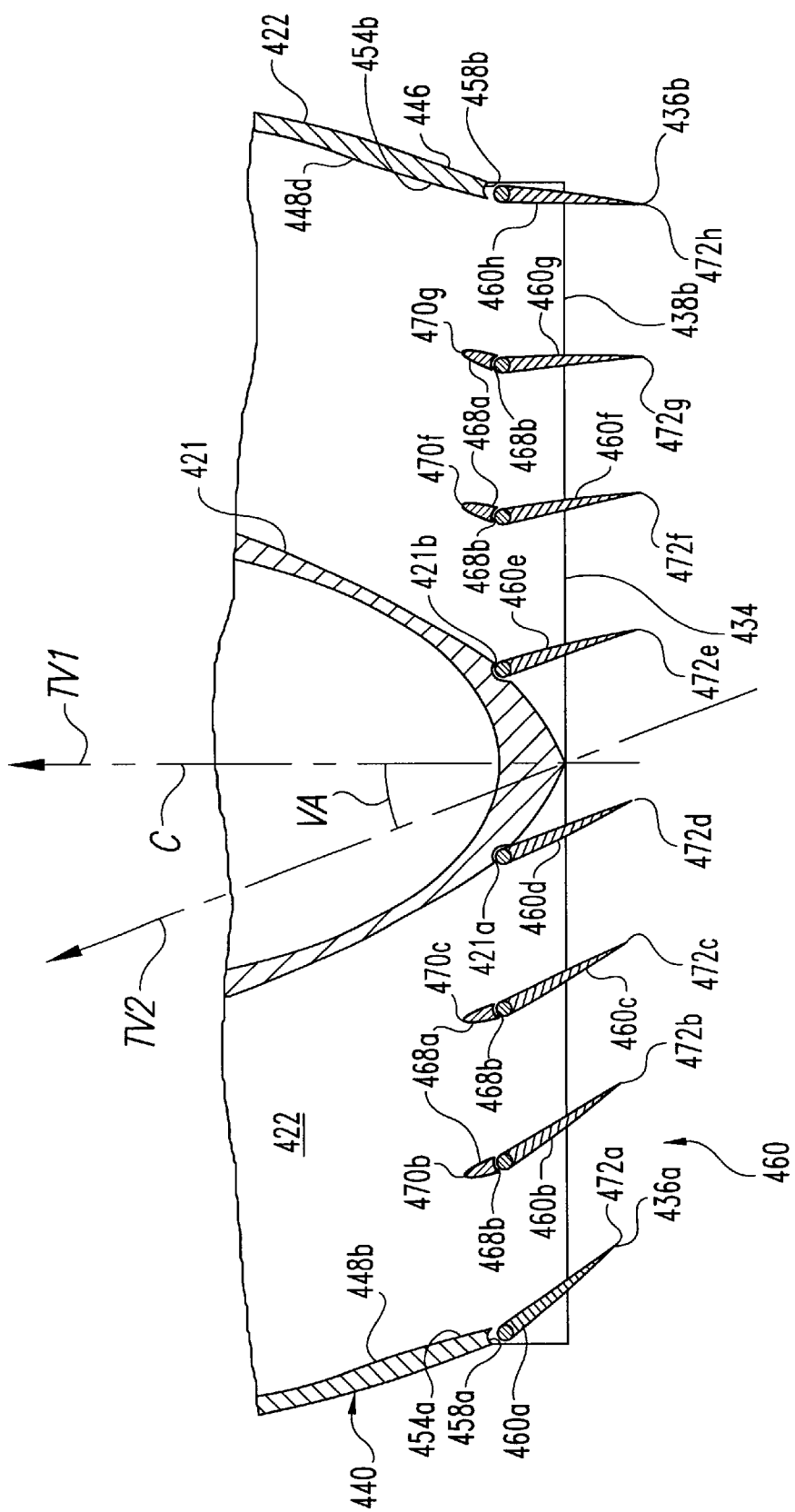
FIG. 15 is a partial, sectional view of the nozzle of FIG. 13 illustrating an orientation of the vanes corresponding to an intermediate, non-neutral vector direction.

For example, in FIG. 15, vanes 460a–460h have been pivoted from the neutral orientation of FIG. 13 to provide a non-neutral thrust vector represented by arrow TV2, which has non-zero horizontal and vertical directional components. When turning vanes 460a–460h from the orientation corresponding to TV1 to the orientation corresponding to TV2, convergence of the members correspondingly decreases to maintain a generally constant effective throat area of nozzle 440 and accordingly maintain a thrust magnitude that is generally constant for both vectors TV1 and TV2, and during, the transition therebetween.

Figure 16:
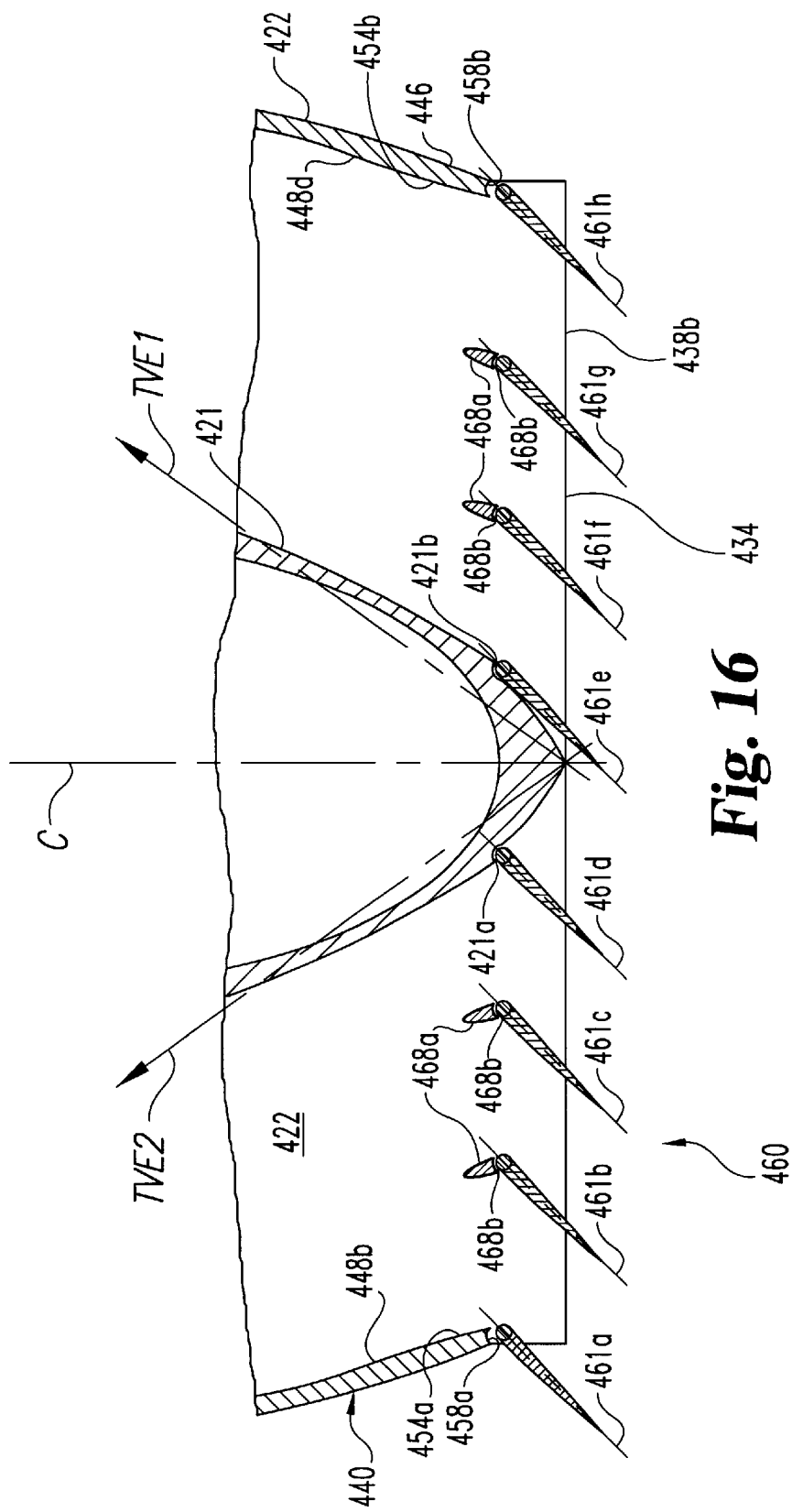
FIG. 16 is a partial, sectional view of the nozzle of FIG. 13 illustrating an orientation of the nozzle vanes corresponding to a vector directional extreme.

Notably, even though vanes 460a–460h may turn in a common rotational direction at the same time (i.e., clockwise or counterclockwise) to effect a directional change in a thrust vector, the amount each vane 460a–460h turns may vary to simultaneously change convergence or divergence. FIG. 16 illustrates a directional extreme or limit of vanes 460a–460h with respect to axis C. This extreme corresponds to the maximum "aft" vector direction provided by mechanism 430. This extreme thrust vector is represented by arrow TVE1. Arrow TVE1 is generally parallel to chord lines 461a–461h of vanes 460a–460h, respectively. It should be noted that the chord lines 461a–461h of vanes 460a–460h are also generally parallel to one another, essentially eliminating any degree of convergence in FIG. 16. In other words, chord lines 461a–461h of the pivoting portions of vanes 460a–460h each form generally the same angle with axis C when at an extreme. In contrast, for a convergent or divergent pattern of vanes 460a–460h the vanes do not each form the same angular relationship with axis C. Preferably, mechanism 430 is configured to turn vanes 460a–460h to a second vector direction extreme represented by arrow TVE2. Arrow TVE2 corresponds to the maximum "forward" vector direction. Although not shown to preserve clarity, when in an orientation to provide the extreme vector direction corresponding to arrow TVE2, chord lines 461a–461h of vanes 460a–460h are generally parallel to each other and each form approximately the same angle with axis C. The gradual decrease of convergence from the neutral vector represented by arrow TV1 of FIG. 15 to the directional extremes of vectors represented by arrows TVE1 and TVE2 of FIG. 16 provides the ability to maintain a generally constant effective throat area throughout the direction range from TVE1 to TVE2 for a given flow level of working fluid supplied to nozzle 440. As a result, a generally constant thrust vector magnitude may be maintained despite changes in thrust vector direction.

Figure 17:
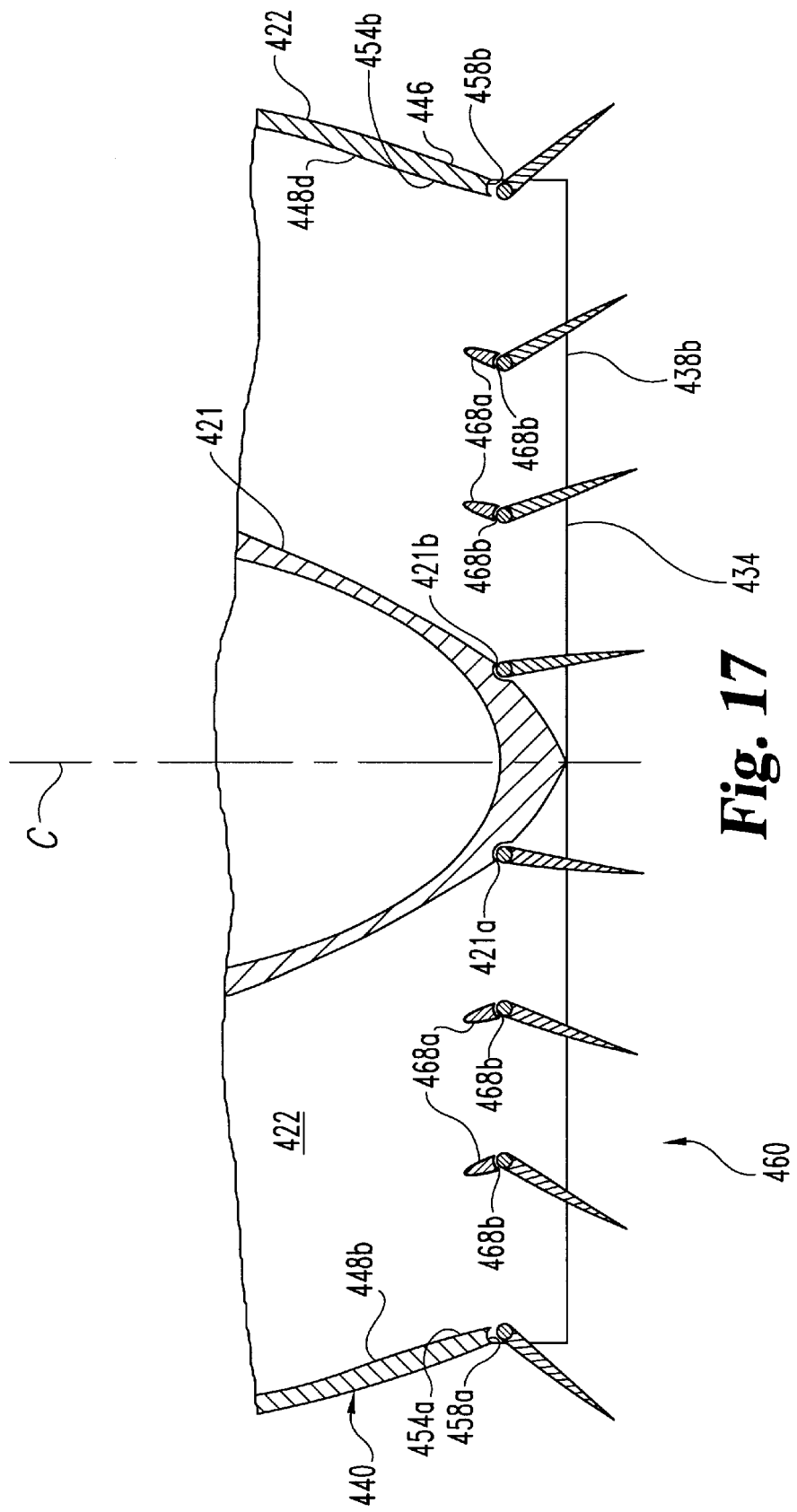
FIG. 17 is a partial, sectional view of the nozzle of FIG. 13 illustrating a neutral vector direction with a splayed vane orientation.

It should be understood, that if a constant magnitude component for a thrust vector is not desired when changing directions, a different schedule of convergence or divergence (splay) may be desired. Indeed, splay or convergence of vanes 460a–460h may be adjusted to modulate thrust magnitude independent of thrust vector direction. A splayed or divergent pattern of vanes 460a–460h is illustrated in FIG. 17 of the type that may be used to modulate thrust magnitude.

The vector directional extremes TEV1 and TEV2 preferably correspond to vector directional angles of about +45° and −45° with respect to axis C, although other extremes and corresponding vectoring ranges are also contemplated for other embodiments. In one such embodiment, the vectoring capability is limited to only one of the fore or aft (positive or negative) direction relative to axis C. In still other embodiments of the present invention, members of vanes may not be arranged in a convergent pattern when providing a neutral vector at an optimum working fluid source operating point. Further, such alternatives need not provide a generally parallel orientation at the thrust vector directional extremes, and may not provide a splay or convergence capability.

Controller 490 is configured to respond to one or more steering signals from control 492 corresponding to a desired directional heading of aircraft 410. Also, controller 490 is configured to monitor aircraft position from sensors 494. Sensors 494 provide one or more position signals corresponding to current aircraft position. For example, one or more position signals may correspond to the degree to which the aircraft is level such as might be designated by pitch and roll positions. Generally, the steering signals and the position signals may include without limitation, information relating to aircraft speed, acceleration, weight, balance, threat avoidance and positional information relating to the six degrees of freedom of motion common to an airborne aircraft.

In response to a request for a thrust vector change, controller 490 preferably utilizes schedule 496. Schedule 496 includes information that relates the desired vector to a corresponding pivotal orientation of each of the vanes. When the desired vector only changes direction, schedule 496 correspondingly indicates an orientation of vanes 460a–460h that maintains a generally constant effective throat area to minimize any vector magnitude change. Further, when it is desired to change thrust magnitude, schedule 496 indicates pivotal positions of vanes 460a–460h that provide the desired change in thrust magnitude. Naturally, schedule 496 may also output information to direct changes in both magnitude and direction simultaneously. Schedule 496 provides the pivotal orientation of the members in the form of one or more control signals to the one or more actuators 485 of actuation subsystem 484. The information or data of schedule 496 is preferably in a multidimensional look-up table format; however, other forms of this information, such as one or more equations, or a combination of techniques may be utilized as would occur to those skilled in the art.

Controller 490 may be arranged to automatically change thrust vectoring to maintain a stable attitude of aircraft 410, based, for example, on input from sensors 494. Further, it is preferred that control system 499 include appropriate filtering, feedback, and other control system elements as are known to those skilled in the art to provide for stable operation.

In the case where linkage 486 includes control linkage 50 or 150, the orientation of vanes 460a–460h may be provided by schedule 496 in terms of a two coordinate position sent to one or more actuators 485 of the one or more control links of thrust directing mechanism 430 as described in connection with mechanisms 30, 130, 230, and 330. Actuation system 484 and any corresponding control linkage responds to such signals to correspondingly provide the desired pivotal orientation of each of vanes 460a–460h.

As in the case of controller 220, controller 490 may be a single unit, or a collection of operatively coupled units on board aircraft 410. Also, controller 490 may be an electronic circuit comprised of one or more components; and may be comprised of digital circuitry, analog circuitry, or both. Controller 490 may be programmable, an integrated state machine or a hybrid combination of integrated and programmable circuits. However, it is preferred that controller 490 be of the programmable variety and that schedule 496 be provided in the form of digital data stored in memory selectively accessible by controller 490.

Sensors 494 and control 492 may provide a signal either in a digital format, analog format, or such other format as is compatible with associated equipment. Correspondingly, equipment coupled to sensors 494 and control 492 is configured to condition and convert sensor signals to the appropriate format as required. All sensors 494 and controls 492 are preferably of a type known to those skilled in the art.

Figure 18:
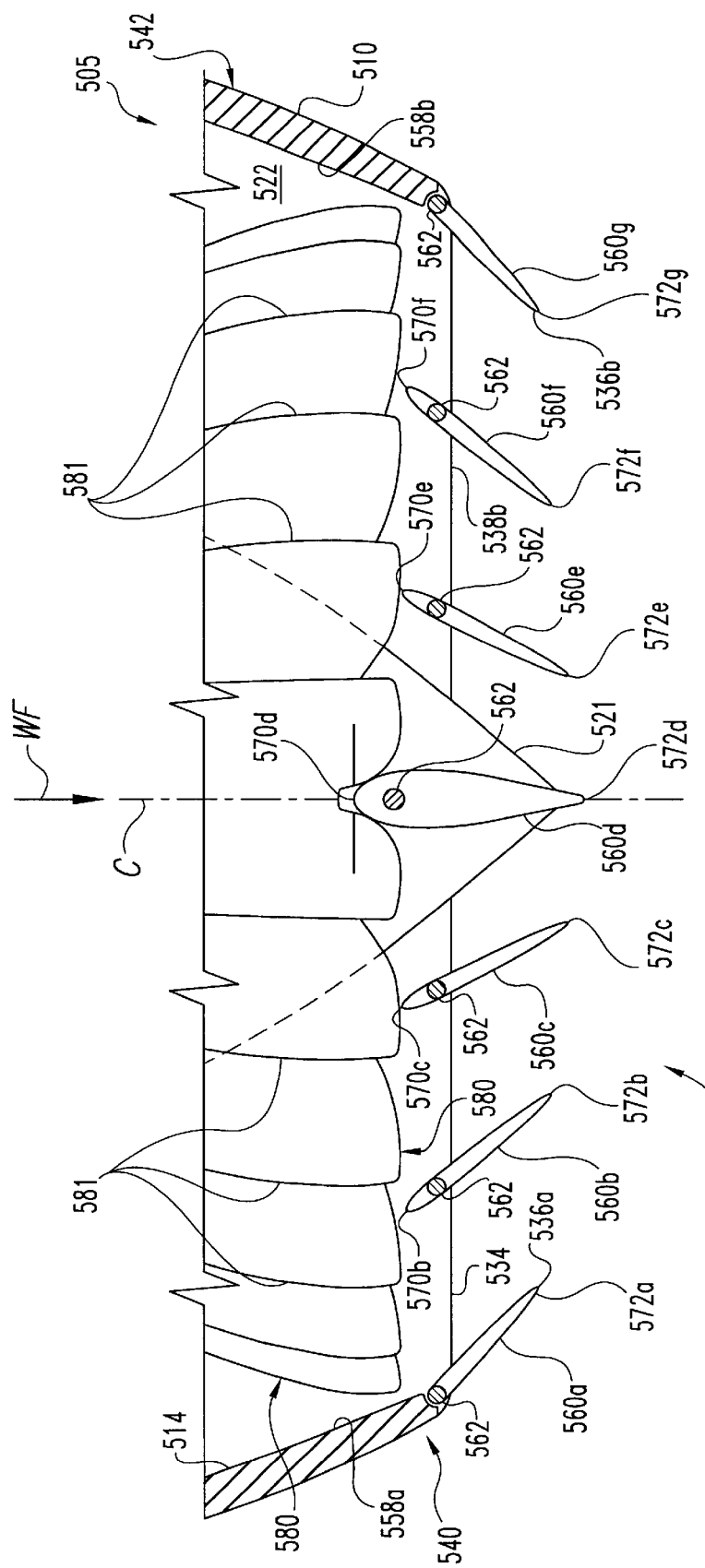
FIG. 18 is a partial, side sectional view of an aircraft with a thrust vectoring nozzle of a sixth embodiment of the present invention.

Referring to FIG. 18, system 505 of another embodiment of the present invention is shown. System 505 includes aircraft 510 with duct 514 terminating in a thrust vectoring nozzle 540. Duct 514 has an intake coupled to a working fluid source that is preferably of the gas turbine engine variety, providing a working fluid in the form of hot exhaust gases. Working fluid is provided from this source in the direction indicated by arrow WF. Centerbody 521 extends from the source into a discharge portion 522 of duct 514. A transition section 542 of duct 514 is included that transitions from a generally circular cross section of duct 514 along axis C to a generally square shape at outlet 534 like section 442 of system 405.

Nozzle 540 includes a thrust directing mechanism 530 with a number of vanes 560a–560g journaled thereto (collectively designated as working fluid directing members 560). Members 560 each include a control shaft 562 extending into a housing having an associated actuation subsystem like subsystem 484 (not shown). Comparable to vanes 460a, 460h of system 405, vanes 560a, 560g of system 505 are nested within recesses defined by opposing sidewalls 558a, 558b of duct 514. Likewise, vanes 560a, 560g provide an articulated extension of sidewalls 558a, 558b. The remaining vanes 560b–560f do not include fixed leading edge caps, instead having integral leading edges 570b, 570f, opposite trailing edges 572b–572f, respectively. Vanes 560a–560g are spaced apart from each other with corresponding control shafts 562. Vanes 560a–560g each pivot in response to rotation of its corresponding shaft 562. Notably, vanes 560a, 560g also include corresponding trailing edges 572a, 572g, which define opposing boundaries 536a, 536b of outlet 534. Generally boundary 538b is shown in FIG. 18 and has an opposing boundary generally parallel to the view plane of FIG. 18 comparable to boundary 438a of outlet 434 described in connection with system 405. Also, vanes 560b–560f may have a contoured side edge 474 like that described in FIG. 14.

Notably, nozzle 540 is a seven vane configuration as opposed to the eight vanes illustrated in connection with system 405. The central vane 560d only partially extends across outlet 534, being interrupted by centerbody 521 to which it is also journaled. Members 560 are configured for pivotal positioning to adjust thrust vector magnitude and direction as described in connection with system 405. Naturally, the central location of vane 560d does not require it to vary from its generally parallel orientation along axis C when it is desired to maintain a nominal or neutral directional component. Preferably, members 560 are coupled to be pivotally oriented under the control of an actuation subsystem (not shown) like subsystem 484 coupled to shafts 562. Also, it is preferred that this subsystem be configured with a control system like control system 499 of system 405. Indeed, in one embodiment of the present invention, nozzle 540 is used in place of nozzle 440 in system 405.

Nozzle 540 also includes a mixer 580 with multiple lobes 581 (partially shown). Mixer 580 provides for the intermixing of cooler gases, for example cold flow from the fan of a turbofan gas turbine engine, to lower the temperature of fluid exiting nozzle 540. Commonly owned U.S. Pat. No. 4,266,084 to Spears, Jr. is cited as an additional source of information regarding mixers.

In general, it is contemplated that the various elements, components, mechanisms, operators, linkages, pieces, portions, parts, devices, methods, techniques, operations, stages, procedures, and processes described in connection with any of the embodiments of the present invention could be modified, rearranged, substituted, deleted, duplicated, combined, divided, or added, as would occur to those skilled in the art without departing from the spirit of the present invention. Moreover, as used herein, it should be appreciated that the terms schedule, look-up table, variable, criterion, characteristic, comparison, quantity, amount, value, constant, flag, data, record, threshold, limit, input, information, and range each generally correspond to one or more signals within processing equipment of the present invention.

It is preferred that the vanes designated by reference numerals 40, 140, 340, 460, 560 of the present invention generally have an airfoil shape; however, other shapes and arrangements as would occur to those skilled in the art are also contemplated. Also, it is preferred that four to nine vanes be utilized, although fewer or more such structures may be employed in accordance with the teachings of the present invention. Indeed, vanes or directing members of the present invention may be straight, cambered, twisted, or split into multiple parts to allow appropriate turning of upstream flow as design requirements dictate. Indeed, vanes or thrust directing members in accordance with the present invention need not be evenly spaced apart or have generally parallel rotational axes, these features being merely preferences; and may be variously oriented with respect to a working fluid steam as would occur to those skilled in the art. Also, vanes and thrust directing members need not provide a splay, convergence, or turning capability in alternative embodiments of the present invention; instead being fixed or limited in movement. Further, control system 499 and controllers 220, 490 may not be present in alternative embodiments.

A few examples of other alternative embodiments of the present invention include, but are not limited to pivotally mounting at least three vanes across an aircraft passage to direct flow of discharged working fluid through the passage. Each of the vanes is coupled to a control link that is selectively movable to correspondingly pivot the vanes. The link is moveable with at least two degrees of freedom and has a corresponding two coordinate position. A desired orientation of the vanes may be determined as a function of the two coordinate position. Several control links, each pivotally coupled to a corresponding group of vanes, may be used. In one configuration, position of the link along a first path corresponds to a desired thrust vector, and position of the link along a second path corresponds to a convergent vane orientation providing a desired throat area.

Each of the vanes may have a corresponding linkage arm pivotally connected thereto, with each linkage arm also being pivotally connected to the control link. Also, the link may be selectively moved by an actuator operatively coupled to a controller to pivot the vanes. In one configuration, the controller is responsive to a thrust control signal which corresponds to a desired pivotal orientation of the vanes and provides an actuation signal corresponding to the thrust control signal as a function of the two coordinate position. The actuator responds to this actuation signal to position the link and correspondingly pivot the vanes to the desired pivotal orientation.

Still another embodiment of the present invention is an aircraft with a passage having an outlet to discharge working fluid to produce thrust with a number of vanes pivotally mounted across the outlet. The vanes include at least a first vane, a second vane mounted adjacent the first vane, and a third vane mounted adjacent the second vane. A thrust control linkage includes a control link spaced apart from the first, second and third vanes. This linkage also includes a first tie rod pivotally coupling the first vane to the link, where the first tie rod has a first length corresponding to a first distance between the link and the first vane. Also, the linkage includes a second tie rod pivotally coupling the second vane to the link. The second tie rod has a second length greater than the first length which corresponds to a second distance between the link and the second vane. The linkage further includes a third tie rod pivotally coupling the third vane to the link. The third tie rod has a third length greater than the second length, the third length corresponding to a third distance between the link and the third vane. The link is actuator controlled to pivot each of the vanes.

A further embodiment is an aircraft with a passage having an outlet discharging working fluid to produce thrust, and vanes pivotally mounted across the outlet to direct fluid flow therethrough relative to a reference axis. The number of vanes is at least three and includes a first vane configured to pivot about a first axis and a second vane configured to pivot about a second axis. Each of a number of arms are pivotally coupled to a corresponding one of the vanes. There are at least three arms, including a first arm connected to the first vane at a first distance from the first axis, and a second arm pivotally connected to the second vane at a second distance from the second axis. The first distance differs from the second distance by a selected amount. An actuator controlled link is pivotally coupled to each of the number of arms to move along a path to controllably pivot each of the vanes in relation to the reference axis. The link has a first position to controllably pivot the first vane to a first pivot angle and the second vane to a second pivot angle. The first pivot angle is greater than the second pivot angle as a function of the selected amount to provide a desired convergent pattern of the vanes. Preferably, the selected amount optimizes thrust efficiency when the vanes are converged to regulate exit area of working fluid discharged through the outlet.

All publications, patents, and patent applications cited in this specification are herein incorporated by reference as if each individual publication, patent, or patent application were specifically and individually indicated to be incorporated by reference. The documents incorporated by reference include, but are not limited to, commonly owned U.S. patent application Ser. No. 09/055,663 filed on Apr. 8, 1998. While the invention has been illustrated and described in detail in the drawings and foregoing description, the same is to be considered as illustrative and not restrictive in character, it being understood that only the preferred embodiment has been shown and described and that all changes, modifications and equivalents that come within the spirit of the invention defined by the following claims are desired to be protected.

What is claimed is:
1. A method, comprising:
 discharging a working fluid through an outlet of an aircraft nozzle to produce thrust, the nozzle being in fluid communication with an aircraft working fluid source and having at least four vanes pivotally mounted across the outlet; and
 pivoting the vanes to change thrust direction during said discharging, said pivoting including adjusting convergence of the vanes to maintain a first throat area;
 modulating thrust magnitude during said discharging by pivoting the vanes to change from the first throat area to a second throat area while maintaining a generally constant direction of the thrust.

2. The method of claim 1, wherein said adjusting includes positioning each of the vanes at a different angle relative to a desired thrust direction.

3. The method of claim 1, wherein the vanes are coupled together by a linkage and are constrained to synchronously pivot in response to movement of the linkage, the linkage is configured for movement with at least two degrees of freedom and has a corresponding two coordinate position, a first coordinate corresponding to rotational position of said linkage about a first axis and a second coordinate corresponding to translational position of said linkage along a second axis.

4. The method of claim 1, wherein said modulating includes splaying the vanes or converging the vanes about an axis along the generally constant thrust direction.

5. The method of claim 1, wherein said adjusting includes changing geometric throat area over a predetermined range of thrust vector directions to maintain a generally constant effective throat area.

6. The method of claim 1, further comprising vectoring the thrust from a first vector direction extreme to a second vector direction extreme relative to a reference axis, the vanes each being oriented at generally the same angle relative to the reference axis at the first extreme and the vanes each being oriented at generally the same angle relative to the reference axis at the second extreme, and the vanes forming a generally symmetric convergent pattern about the reference axis for a thrust vector direction between the first and second extremes.

7. The method of claim 1, wherein a mixer is positioned in the nozzle.

8. The method of claim 1, wherein the working fluid source is a lift fan and the lift fan includes a centerbody extending through at least a portion of the nozzle, and at least one of the vanes is pivotally coupled to the centerbody.

9. The method of claim 8, wherein the working fluid source is a lift fan positioned in a passage through a fuselage of an aircraft, the nozzle is coupled to said passage to facilitate vertical or short take-off and vertical landing operation of the aircraft, a thrust vector directional range of the vanes is at least about ±45 degrees relative to a reference axis, the outlet has a generally rectangular cross section, and the nozzle transitions from a generally circular cross section to the generally rectangular cross section of the outlet, and the vanes each have an end contour configured to define a relatively constant spacing from a curved wall of the nozzle.

10. A method, comprising: operating an aircraft with a passage having an outlet, the aircraft having at least four vanes pivotally mounted across the outlet, said operating including discharging a working fluid through the outlet to produce thrust; pivoting the vanes to change thrust direction during said discharging; and splaying the vanes during said discharging to modulate thrust magnitude while maintaining a generally constant thrust vector direction.

11. The method of claim 10, wherein said pivoting includes adjusting convergence of the vanes to maintain a generally constant effective throat area.

12. The method of claim 10, wherein the vanes are coupled together by a linkage and are constrained to synchronously pivot in response to movement of the linkage, said pivoting being performed by moving the linkage.

13. The method of claim 10, wherein said modulating further includes converging the vanes about an axis along the generally constant thrust direction.

14. The method of claim 10, further comprising vectoring the thrust from a first vector direction extreme to a second vector direction extreme relative to a reference axis, the vanes each being oriented at generally the same angle relative to the reference axis at the first extreme, the vanes each being oriented at generally the same angle relative to the reference axis at the second extreme, and the vanes forming a generally symmetric convergent pattern about the reference axis for a thrust vector direction between the first and second extremes.

15. The method of claim 10, wherein the vanes each include a fixed leading edge cap.

16. The method of claim 10, wherein a lift fan is positioned in the passage to provide the working fluid, the passage extends through a fuselage of the aircraft to facilitat vertical of short take-off and vertical landing operation, a thrust vector directional range is at least about ±45 degrees relative to a reference axis, the outlet has a generally rectangular cross section, and the passage transitions from a generally circular cross section to the generally rectangular cross section of the outlet.

17. A method, comprising:

operating an aircraft with a passage having an outlet, the aircraft having at least four vanes pivotally mounted across the outlet, said operating including discharging a working fluid through the outlet to produce thrust;

pivoting the vanes to vector the thrust produced by said discharging over a predetermined range of directions; and changing geometric throat area during said pivoting to maintain a generally constant effective throat area over the range of directions.

18. The method of claim 17, wherein the vanes arc coupled together by a linkage and are constrained to synchronously pivot in response to movement of the linkage, said pivoting is performed by moving the linkage, the linkage is configured for movement with at least two degrees of freedom and has a corresponding two coordinate position, a first coordinate corresponding to rotational position of said linkage about a first axis and a second coordinate corresponding to translational position of said linkage along a second axis.

19. The method of claim 17, further comprising modulating thrust magnitude by adjusting convergence or divergence of the vanes about an axis along a desired thrust vector direction.

20. The method of claim 17, wherein the range has a first extreme and a second extreme relative to a reference axis, the vanes each being oriented at generally the same angle relative to the reference axis at the first extreme, the vanes each being oriented at generally the same angle relative to the reference axis at the second extreme, and the vanes forming a generally symmetric convergent pattern about the reference axis for a desired thrust direction between the first and second extremes.

21. The method of claim 20, wherein a lift fan is positioned in the passage to provide the working fluid for said discharging, the passage extends through a fuselage of the aircraft to facilitate vertical or short take-off and vertical landing operation, the range of thrust directions corresponds to at least about ±45 degrees relative to the reference axis, and the desired thrust direction is generally parallel to the reference axis.

22. A combination, comprising:

(a) an aircraft defining a passage having an outlet;

(b) a lift fan mounted in said passage operable to discharge working fluid through said outlet to produce thrust;

(c) at least four vanes pivotally mounted across said outlet to vector the thrust;

(d) an actuator controlled linkage coupling said vanes, said vanes simultaneously pivoting in response to movement of said linkage;

(e) a controller operable to generate a vane control signal to provide a desired thrust vector, said control signal corresponding to a desired pivotal orientation of each of said vanes, said control signal being determined in accordance with a schedule corresponding to a relationship between thrust vector direction and nozzle throat area, said schedule being stored in said controller; and wherein said linkage responds to said control signal to correspondingly provide said desired pivotal orientation of each of said vanes.

23. The combination of claim 22, further comprising an input device operatively coupled to said controller, said input device providing a steering signal corresponding to said desired thrust vector.

24. The combination of claim 22, wherein said passage transitions from a generally circular cross section upstream of said outlet to a generally rectangular cross section at said outlet, said vanes number at least six, a first one of said vanes is mounted to extend a first side of said passage, a second one of said vanes is mounted to extend a second side of said passage, said first side being generally opposite said second side.

25. The combination of claim 22, wherein said linkage includes a pivotally mounted control link configured for movement with two degrees of freedom and has a corresponding two coordinate position, a first coordinate corresponding to rotational position of said link about a first axis and a second coordinate corresponding to translational position of said link along a second axis.

26. The combination of claim 22, wherein said vanes each include a fixed leading edge cap.

27. The combination of claim 22, wherein said desired thrust vector has a selected direction and a selected magnitude and said schedule provides a pivotal position of each of said vanes as a function of said selected direction and said selected magnitude.

28. The combination of claim 22, wherein said schedule provides for adjustment of a pivotal position of each of said vanes to maintain a generally constant effective throat area when changing a thrust vector direction without changing a thrust vector magnitude.

29. A combination, comprising:
an aircraft defining a passage therethrough having an outlet, said outlet having a cross section with a first generally straight boundary opposite a second generally straight boundary, and a third generally straight boundary opposite a fourth generally straight boundary, said first and second boundaries being oriented at generally right angles to said third and fourth boundaries;
a lift fan mounted in said passage to discharge a working fluid through said outlet to produce thrust;
a first vane aligned to extend a first side of said passage, said first vane being pivotally mounted to selectively deflect the working fluid passing through said passage and including a trailing edge defining said first boundary of said outlet;
a second vane aligned to extend a second side of said passage, said second side being opposite said first side, said second vane being pivotally mounted to selectively deflect the working fluid passing through said passage and including a trailing edge defining said second boundary of said outlet;
at least two other vanes pivotally mounted across said outlet between said first vane and said second vane to controllably deflect the working fluid; and
an actuation system operable to synchronously pivot said first vane, said second vane, and said guide vanes to adjust thrust direction while maintaining a generally uniform effective throat area.

30. The combination of claim 29, wherein said passage transitions from a generally circular cross section to a generally rectangular cross section having rounded corners, said generally rectangular cross section being closer to said outlet than said generally circular cross section.

31. The combination of claim 29, wherein said vane actuation system is further operable to modulate thrust by adjusting convergence or splay of said first vane, said second vane, and said other vanes.

32. The combination of claim 29, further comprising a control link pivotally coupled to said first vane, said second vane, and said other vanes said link being operable to move with two degrees of freedom, a first one of said degrees corresponding to rotational position of said link about a first axis, and a second one of said degrees corresponding to translational position of said link along a second axis.

33. The combination of claim 29, wherein said number of other vanes spanning across said outlet between said first vane and said second vane is at least four.

34. The combination of claim 33, further comprising a centerbody extending through said passage between said lift fan and said outlet, a pair of said other vanes being pivotally mounted to said centerbody.

35. The combination of claim 33, wherein each member of said other vanes has a pair of opposing ends positioned between a pair of converging inner side walls, said opposing ends each being contoured to maintain a generally constant spacing with said converging inner walls.

36. A combination, comprising:
an aircraft defining a passage with an outlet;
a working fluid source mounted in said passage to discharge a working fluid through said outlet to produce thrust;
a plurality of working fluid directing members mounted across said passage, said directing members including at least three leading edge caps and at least three articulating vanes, said leading edge caps each being fixed to a wall defining said passage, and said vanes each corresponding to one of said leading edge caps and being configured to pivot relative thereto; and
an actuation system operable to pivot said vanes to deflect the working fluid discharged through said outlet to vector thrust.

37. The combination of claim 36, wherein said outlet has a cross section with a first generally straight boundary opposite a second generally straight boundary and a third generally straight boundary opposite a fourth generally straight boundary, and said first and second boundaries are oriented at generally right angles to said third and fourth boundaries.

38. The combination of claim 36, further comprising:
a first vane aligned to extend a first side of said passage, said first vane being pivotally mounted to selectively deflect the working fluid passing through said passage and including a trailing edge defining a first boundary of said outlet; and
a second vane aligned to extend a second side of said passage, said second side being opposite said first side, said second vane being pivotally mounted to selectively deflect the working fluid passing through said passage and including a trailing edge defining a second boundary of said outlet opposite said first boundary.

39. The combination of claim 36, wherein said leading edge caps each define a recess configured to receive a portion of a respective one of said vanes.

40. The combination of claim 36, further comprising a centerbody extending from said working fluid source toward said outlet, at least one of said vanes being journaled to said centerbody.

41. The combination of claim 36, further comprising a centerbody extending from said working fluid source toward said outlet, at least one of said vanes being received within a recess defined by said centerbody.

42. The combination of claim 36, wherein said fixed leading edge caps are arranged in a generally convergent pattern about a reference axis.

43. The combination of claim 42, wherein said actuation system is operable to synchronously pivot said vanes to adjust thrust direction relative to said reference axis and convergence of said vanes about said reference axis.

44. A combination, comprising:

an aircraft defining a passage with an outlet;

a working fluid source mounted in said passage to discharge a working fluid through said outlet to produce thrust;

a plurality of working fluid directing members mounted across said passage, said directing members including at least three leading edge caps and at least three articulating vanes, said vanes each corresponding to one of the leading edge caps and being configured to pivot relative thereto; and an actuation system operable to pivot said vanes to adjust convergence of said vanes about a reference axis.

45. The combination of claim 44, wherein said leading edge caps are fixed to a wall of said passage and are arranged in a convergent pattern relative to said reference axis.

46. The combination of claim 44, wherein said leading edge caps each define a recess configured to receive a portion of a respective one of said vanes.

47. The combination of claim 44, further comprising a centerbody extending from said working fluid source toward said outlet, at least one of said vanes being journaled to said centerbody.

48. The combination of claim 44, further comprising a centerbody extending from said working fluid source toward said outlet, at least one of said vanes being received within a recess defined by said centerbody.

49. The combination of claim 44, wherein said passage transitions from a generally circular cross section to a generally rectangular cross section along a direction from said working fluid source to said outlet.

50. A method, comprising:

operating an aircraft with a nozzle having an outlet, the aircraft having at least four vanes pivotally mounted across the outlet, said operating including discharging a working fluid through the outlet to produce thrust;

pivoting the vanes to vector the thrust produced by said discharging over a predetermined range of directions; and changing geometric throat area of the nozzle during said pivoting in accordance with a schedule corresponding to a relationship between thrust vector direction and effective throat area of the nozzle.

51. The method of claim 50, wherein the vanes are coupled together by a linkage and are constrained to synchronously pivot in response to movement of the linkage, said pivoting is performed by moving the linkage, the linkage is configured for movement with at least two degrees of freedom and has a corresponding two coordinate position, a first coordinate corresponding to rotational position of said linkage about a first axis and a second coordinate corresponding to translational position of said linkage along a second axis.

52. The method of claim 50, wherein the range has a first extreme and a second extreme relative to a reference axis, the vanes each being oriented at generally the same angle relative to the reference axis at the first extreme, the vanes each being oriented at generally the same angle relative to the reference axis at the second extreme, and the vanes forming a generally symmetric convergent pattern about the reference axis for a desired thrust direction between the first and second extremes.

53. The method of claim 50, wherein a lift fan is positioned in the passage to provide the working fluid for said discharging, the passage extends through a fuselage of the aircraft to facilitate vertical or short take-off and vertical landing operation, the range of thrust directions corresponds to at least about ±45 degrees relative to the reference axis, and the desired thrust direction is generally parallel to the reference axis.

* * * * *